United States Patent [19]

Yamashita et al.

[11] Patent Number: 5,128,915

[45] Date of Patent: * Jul. 7, 1992

[54] OPTICAL PICKUP DEVICE

[75] Inventors: Tsukasa Yamashita, Nara; Nobuhisa Inoue, Kyoto; Shiro Ogata, Takatsuki; Mitsutaka Katoh, Kyoto; Masaharu Matano; Kazuhiko Mori, both of Otokuni; Isao Taguchi, Nagaokakyo, all of Japan

[73] Assignee: Omron Tateisi Electronic Co., Kyoto, Japan

[ * ] Notice: The portion of the term of this patent subsequent to Apr. 12, 2005 has been disclaimed.

[21] Appl. No.: 436,951

[22] Filed: Nov. 15, 1989

Related U.S. Application Data

[60] Continuation of Ser. No. 127,204, Dec. 1, 1987, abandoned, which is a division of Ser. No. 772,162, Sep. 3, 1985, Pat. No. 4,737,946.

[30] Foreign Application Priority Data

| Sep. 3, 1984 | [JP] | Japan | 59-184776 |
| Sep. 3, 1984 | [JP] | Japan | 59-184777 |
| Sep. 5, 1984 | [JP] | Japan | 59-187009 |
| Sep. 14, 1984 | [JP] | Japan | 59-193662 |
| Sep. 14, 1984 | [JP] | Japan | 59-193663 |
| Sep. 14, 1984 | [JP] | Japan | 59-193664 |
| Sep. 14, 1984 | [JP] | Japan | 59-193665 |
| Sep. 14, 1984 | [JP] | Japan | 59-193666 |

[51] Int. Cl.$^5$ .................................................. G11B 7/00
[52] U.S. Cl. .................................................. 369/44.12
[58] Field of Search ................................. 369/43–46, 369/97, 112, 122; 350/96.11–96.15, 96.18; 250/201 DF, 201.5; 372/33

[56] References Cited

U.S. PATENT DOCUMENTS

| 4,286,838 | 9/1981 | Huignard et al. | 350/96.11 |
| 4,302,830 | 11/1981 | Hamaoka et al. | 369/45 |
| 4,394,060 | 7/1983 | Verber et al. | 350/96.13 |
| 4,425,023 | 1/1984 | Matsumoto et al. | 350/96.13 |
| 4,478,483 | 10/1984 | Sprague | 350/96.14 |
| 4,574,371 | 3/1986 | Takemura et al. | 369/112 X |
| 4,640,574 | 2/1987 | Unger | 350/96.11 |
| 4,669,071 | 5/1987 | Ninami et al. | 369/44.12 |
| 4,737,946 | 4/1988 | Yamashita | 369/45 |
| 4,747,090 | 5/1988 | Tamashita et al. | 369/112 X |

FOREIGN PATENT DOCUMENTS

| 0116467 | 8/1984 | European Pat. Off. |
| 58-130448 | 3/1983 | Japan | 369/45 |
| 59-079441 | 9/1984 | Japan |
| 59-107431 | 10/1984 | Japan |
| 60-3209 | 2/1985 | Japan | 350/96.11 |
| 2070314 | 9/1981 | United Kingdom |
| 84/00243 | 1/1984 | World Int. Prop. O. |

OTHER PUBLICATIONS

"Electrooptic Fresnel lens-scanner with an array of Channel Waveguides", Takizawa; Applied Optics, vol. 22, No. 16/15 Aug. 83.

"Focusing Grating for Integrated Optical Disk Pickup Device"; Ura et al. 85/10 vol. J68-C No. 10.

(List continued on next page.)

Primary Examiner—Donald McElheny, Jr.
Attorney, Agent, or Firm—Dickstein, Shapiro & Morin

[57] ABSTRACT

A device for processing optical data comprising:
an optical waveguide formed on a substrate,
a light source for the laser beam to be admitted into the waveguide,
lens means provided on the waveguide for causing the beam propagating through the waveguide to emerge obliquely upward and focusing the emergent beam two-dimensionally,
means for receiving the beam reflected obliquely from above,
a base provided with the laser light source, the substrate and the light receiving means,
a focusing drive mechanism for adjusting the position of the base upward or downward, and
a tracking drive mechanism for adjusting the position of the base laterally.

12 Claims, 26 Drawing Sheets

OTHER PUBLICATIONS

"Integrated Optical Detector Array, Waveguide and Modulator based on Silicon Technology", Marx et al., IEEE Journal of Solid State Circuits, vol. SC-12, No. 1, Feb. 1977, pp. 10-13.

"Graded-index Fresnel Lenses For Integrated Optics", T. Suhara, et al; Applied Optics, vol. 21, No. 11, p. 1966; 1 Jun. 1982.

"Optical Waveguide Lenses"; Inoue, et al; Optica Acta, vol. 26, No. 8, pp. 961-968; Aug. 1979.

"Electrooptic Leaky Anisotropic Waveguides Using Nematic Liquid Crystal Overlayers"; Okamura et al, Journal of Lightwave Technology, vol. LT-2, No. 3, Jun. 1984, pp. 292-295.

Fairchild Semiconductor; Oct. 1965; SL-64; $\mu$A 709.

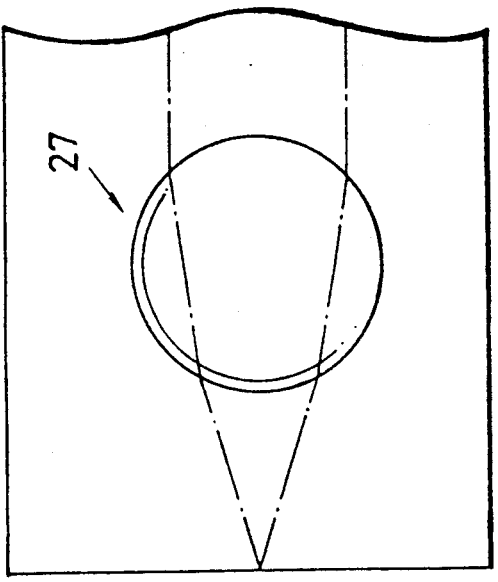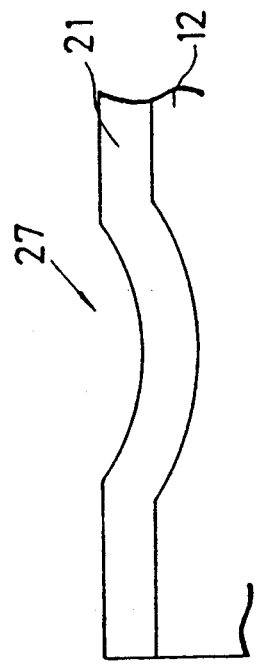
FIG. 5(A)  FIG. 5(B)
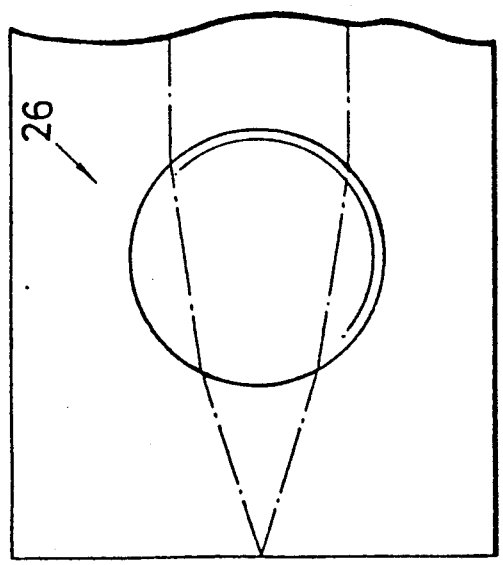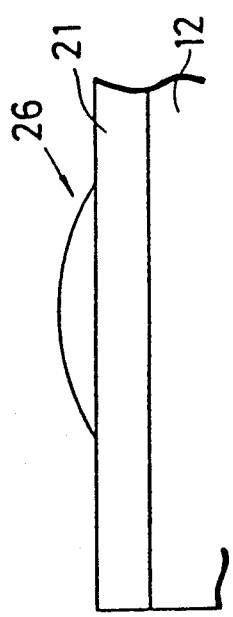
FIG. 6(A)  FIG. 6(B)

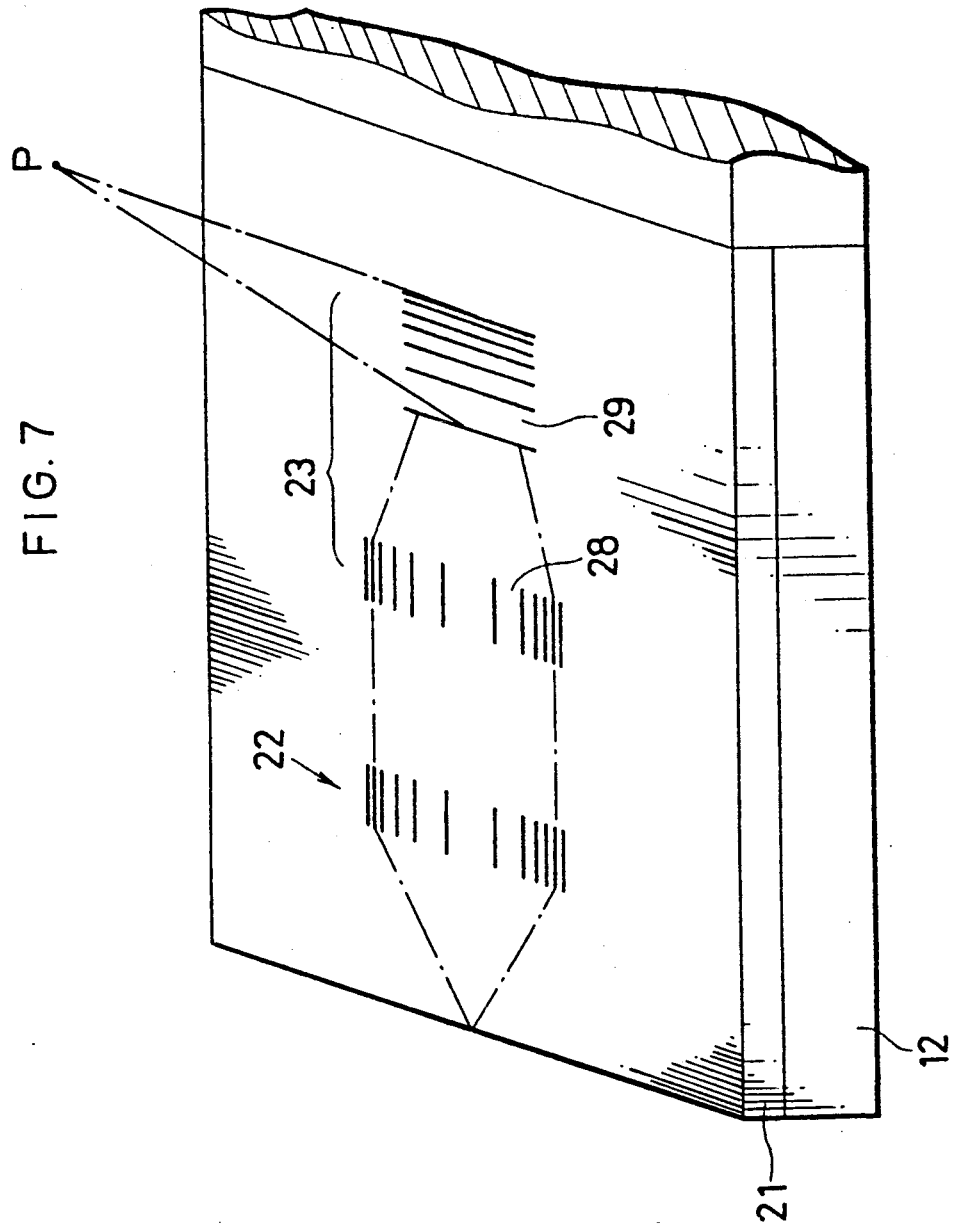

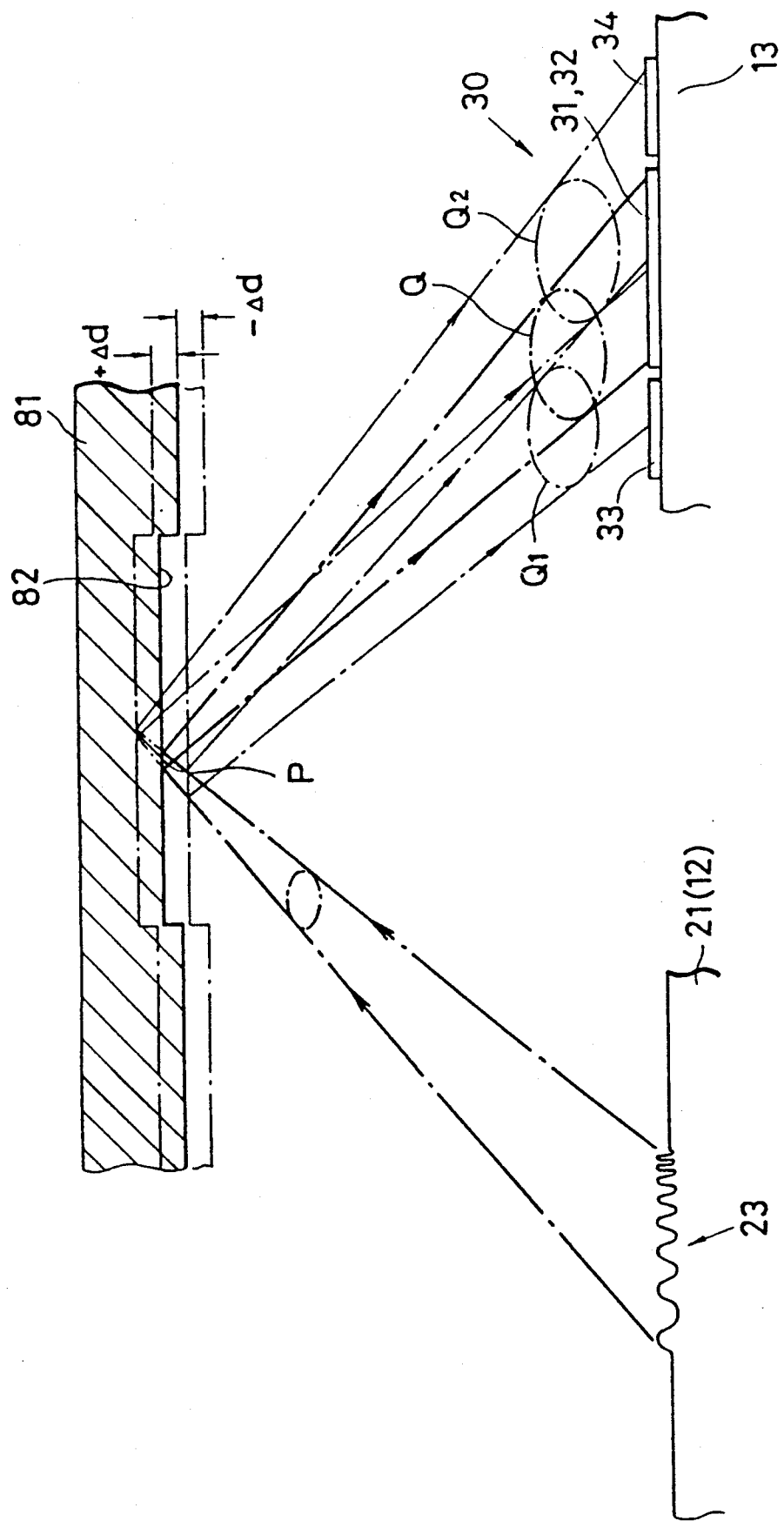

FIG. 9
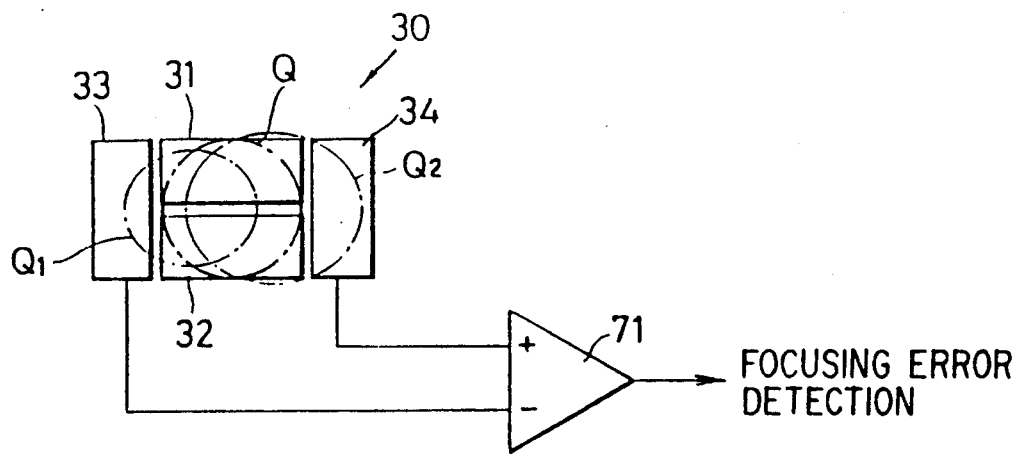
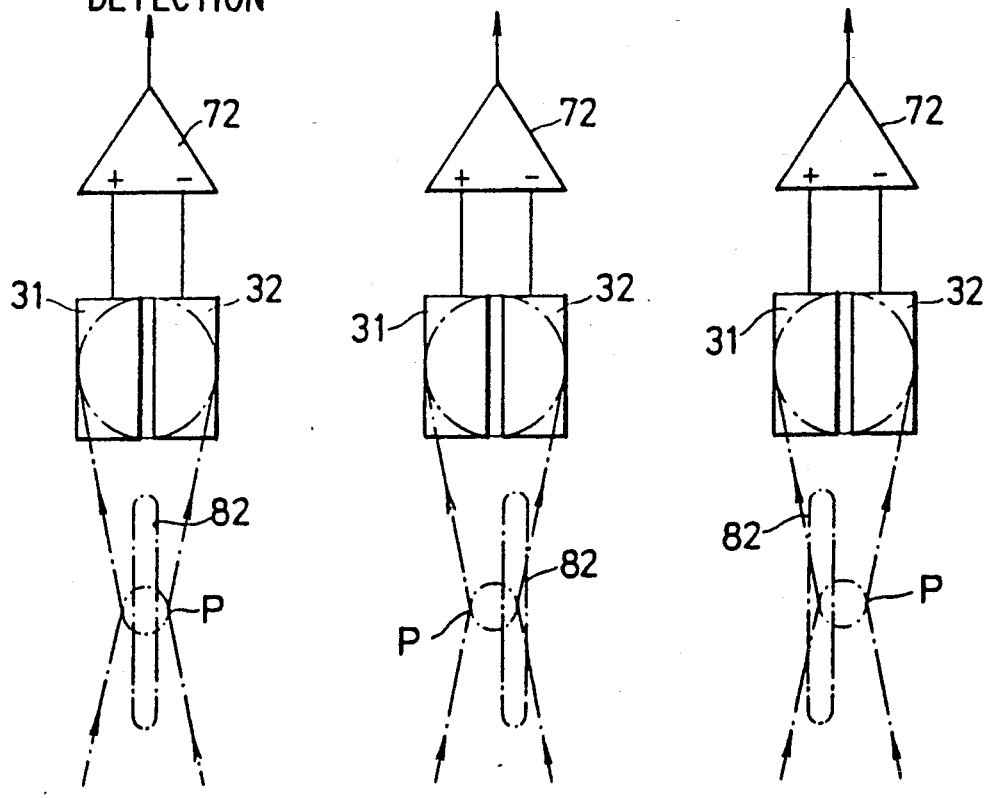
FIG. 10(A)   FIG. 10(B)   FIG. 10(C)

OPTICAL PICKUP DEVICE

This application is a continuation of application Ser. No. 127,204, filed Dec. 1, 1987 and now abandoned, which in turn is a divisional application of Ser. No. 772,162 filed Sep. 3, 1985 which issued as U.S. Pat. No. 4,737,946 on Apr. 12, 1988.

BACKGROUND OF THE INVENTION

1. Technical Field

The present invention relates to devices for processing optical data typical of which are optical pick-up devices for reading data from optical discs, and devices for writing data in photomagnetic discs or reading data therefrom. The optical pick-up device is adapted to converge laser light from a semiconductor laser or the like, project the converged light to the data record portion of the optical disc and read data according to the variations of intensity of the light reflected from the portion.

2. Prior Art

With the introduction of optical disc memories of high record density into use in recent years, it is expected to develop efficient, compact and lightweight optical pick-up devices.

Conventional optical pick-up devices consist primarily of an optical system and a drive system.

Basically, the optical system has the function of converging laser light on the record portion of an optical disc by a condenser lens and converting the light reflected from the disc into electric signals by a photodiode. Thus, variations in the amount of reflected light due to the data recorded on the disc are taken out in the form of electric signals.

Such optical systems are divided, according to their action, into isolator optical systems for separating the light reflected from the optical disc from the light impinging on the disc, beam converging optical systems for converging the light to be projected onto the optical disc to a spot of about 1 micron in diameter, and error detecting optical systems for detecting focusing errors or tracking errors. These optical systems comprise a suitable combination of elements such as a semiconductor laser serving as a light source, various lenses, prisms, diffraction grating, mirror, quarter wave plate and photodiode.

Useful drive systems include a focusing drive system, tracking drive system and a radial feed drive system.

The focusing drive system is adapted to maintain a suitable distance between the condenser lens and the optical disc so that the light beam formed by the condenser lens forms a proper spot on the disc surface. Most commonly, the condenser lens is moved axially thereof for adjustment.

The tracking drive system is adapted to cause the laser spot to follow the track of the optical disc without displacement. The mechanisms generally used for this purpose include one for moving the condenser lens perpendicular to the optical axis for adjustment, one for moving the entire optical pick-up head radially of the optical disc for adjustment, and one comprising a pivotable mirror for adjusting the angle of incidence of light on the condenser lens.

The radial feed drive system is a mechanism for feeding the optical pick-up head radially of the optical disc usually by a linear motor.

These conventional optical pick-up devices have the following drawbacks.

The optical system, which is complex, is cumbersome to optically align the components, which are liable to become out of alignment due to vibration.

The device comprises a large number of components, takes much time to assemble and is low in productivity.

The device comprises expensive optical components and is expensive in its entirety.

Use of large optical components renders the device large-sized, while the means needed for holding the optical components make the whole device heavy.

SUMMARY OF THE INVENTION

The main object of the present invention is to provide a device for processing optical data which is compact and lightweight and does not require a complicated procedure for optically aligning the components.

The device of the present invention for processing optical data comprises an optical waveguide formed on a substrate, a light source for the laser beam to be admitted into the waveguide, lens means provided on the waveguide for causing the beam propagating through the waveguide to emerge obliquely upward and focusing the emergent beam two-dimensionally, means for receiving the beam reflected obliquely from above, a base provided with the laser light source, the substrate and the light receiving means, a focusing drive mechanism for adjusting the position of the base upward or downward, and a tracking drive mechanism for adjusting the position of the base laterally.

The device of the invention includes none of lens, prism, diffraction grating, mirror, quarter wave plate, etc. serving as optical components and can therefore be made compact and lightweight. Especially because laser light is caused to emerge from the optical waveguide obliquely upward and to impinge on the light receiving means upon reflection obliquely from above, the isolator optical system needed for conventional pick-up devices can be dispensed with. Further for optical alignment, the light receiving means only needs to be positioned accurately. When the optical waveguide, the lens means and the light receiving means are provided on a single substrate, these components need not be optically aligned during assembly.

According to the present invention, a single light beam is emitted from the substrate, or three separate beams are emitted and converged toward three different positions individually. In the latter case, the central beam is usable for picking up data and also for detecting focusing errors, and the two side beams for detecting tracking errors.

Furthermore, focusing control and tracking control can be achieved by altering the focus position of the lens means utilizing an electrooptical effect. This serves to render the device more small-sized and light-weight.

Other features of the present invention will become apparent from the following embodiments to be described with reference to the accompanying drawings.

BRIEF DESCRIPTION OF THE DRAWINGS

FIGS. 5(A) and (B) are a plan view and a sectional view, respectively, showing a Laneburg lens;

FIGS. 6(A) and (B) are a plan view and a sectional view, respectively, showing a geodesic lens;

FIG. 7 is a perspective view showing another example of coupling lens;

FIG. 8 is a sectional view showing the position relation between an optical disc and the optical pick-up head;

FIG. 9 is a diagram illustrating the principle for detecting focusing errors on the light receiving portion;

FIG. 10, consisting of (A)-(C), is a diagram illustrating the principle for detecting tracking errors;

DESCRIPTION OF THE PREFERRED EMBODIMENTS (1) Outline of Construction of Optical Pick-Up Head FIG. 1 shows the construction of an optical pick-up head. A semiconductor laser 11 and two substrates 12, 13 are fixedly arranged on a base 10. The laser 11 is driven by current given to electrodes 18 and 19 formed on the base 10.

Figure 1:
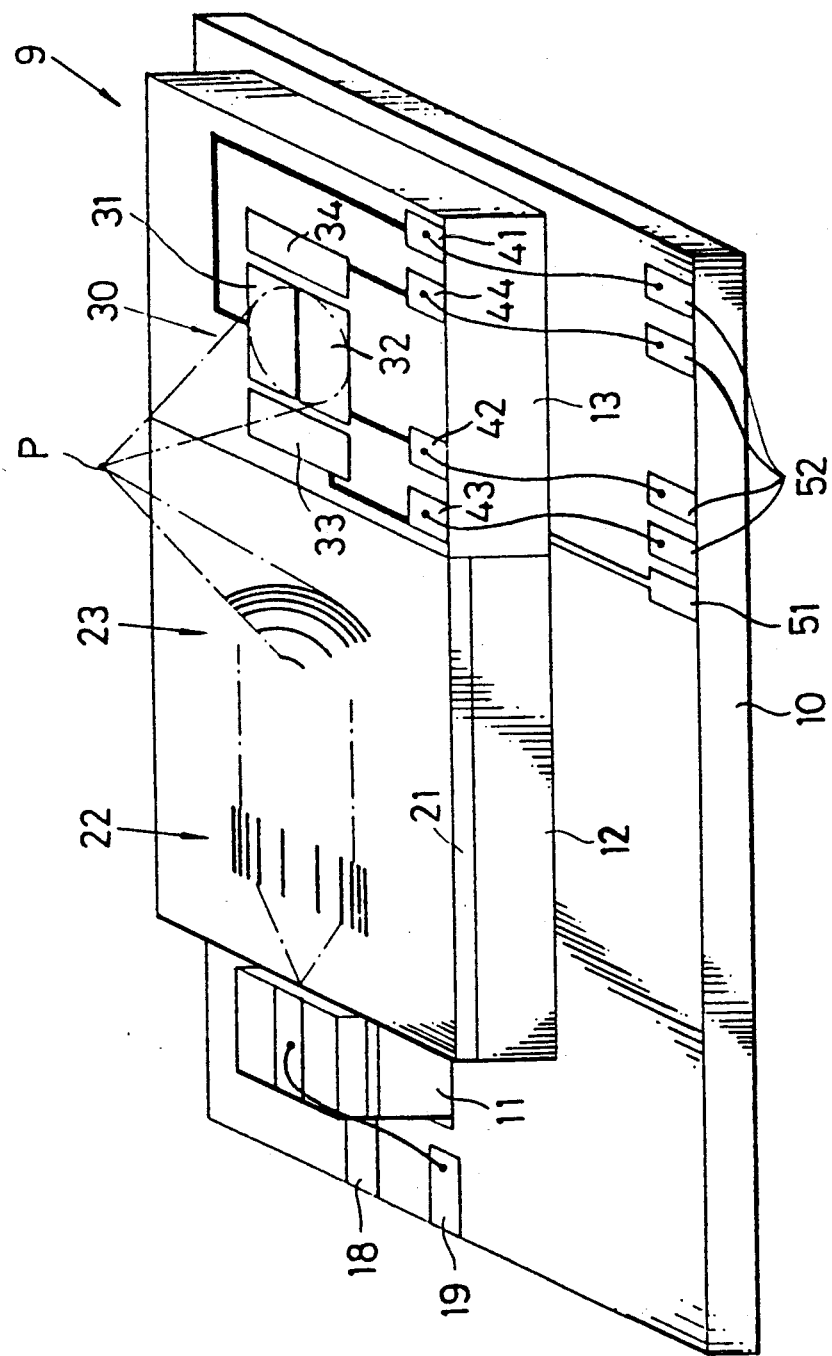
FIG. 1 is a perspective view showing an optical pick-up head.

The substrate 12 is made, for example, of a silicon crystal. An optical waveguide layer 21 formed over the upper surface of the substrate 12 by thermally oxidizing the upper surface of the substrate 12, vacuum evaporation of $SiO_2$ or sputtering of $SiO_2$ to form an $SiO_2$ buffer layer on the upper surface, and thereafter sputtering glass over the layer. The laser 11 emits a laser beam, which is admitted into, and propagates through, the waveguide layer 21. A collimating lens 22 and a coupling lens 23 are formed on the waveguide layer 21. The collimating lens 22 converts the laser beam, spreading out when emitted from the laser 11, into a beam of parallel rays. The laser beam propagating through the layer 21 is caused to emerge obliquely upward and two dimensionally focused by the coupling lens 23. The point where the emergent laser beam is focused into a spot (about 1 μm in diameter) is indicated at P. When the data recorded on an optical disc is to be read, the optical pick-up head 9 is so positioned that the laser spot P is positioned on the data record surface of the disc.

When $LiNbO_3$ crystal is used for the substrate 12, the waveguide layer 21 is formed by thermally diffusing Ti through the upper surface thereof.

The other substrate 13 is made also of Si crystal, for example. A light receiving unit 30 is provided on the substrate 13 for receiving the beam reflected from the record surface of the disc. The unit 30 is so disposed as to receive the beam reflected obliquely downward from the position of the laser spot P.

The light receiving unit 30 comprises four independent photodetectors 31 to 34. The photodetectors 31 and 32 are arranged adjacent to each other in the center, and the other photodetectors 33 and 34 are arranged on opposite sides of them. The photodetectors 31 to 34 are provided, for example, by forming four independent PN junctions (photodiodes) on the Si substrate 13. The output signals from the photodetectors 31 to 34 are led through a wiring pattern on the substrate 13 respectively to electrodes 41 to 44, from which the signals are individually led to electrodes 52 on the base 10 through wire bonding. Another electrode 51 on the base 10 is a common electrode for the photodetectors 31 to 34.

Since the data recorded on the optical disc appears as variations in the intensity of reflected beam, the cumulative signal of the output signals from all the photodetectors 31 to 34, or a cumulative signal from the photodetectors 31 and 32 serves as a data reading signal.

Although the substrates 12 and 13 are in contact with each other in FIG. 1, these substrates may be positioned as spaced apart by a suitable distance.

Alternatively, the substrates 12 and 13 may be integral. When the substrates 12 and 13 are in the form of an integral piece of Si, a waveguide layer is formed over the entire upper surface of the substrate, and four independent amorphous silicon (a-Si) photovoltaic elements are directly formed on the waveguide layer by the CVD process to provide the light receiving unit 30.

Further when the substrates 12 and 13 are in the form of an integral piece of $LiNbO_3$, a light receiving unit of a-Si can be similarly formed on the upper surface of the piece.

Alternatively, CdTe, CdS or the like is usable for forming the photovoltaic elements.

(2) Coupling of Semiconductor Laser to Waveguide Layer

Figure 2:
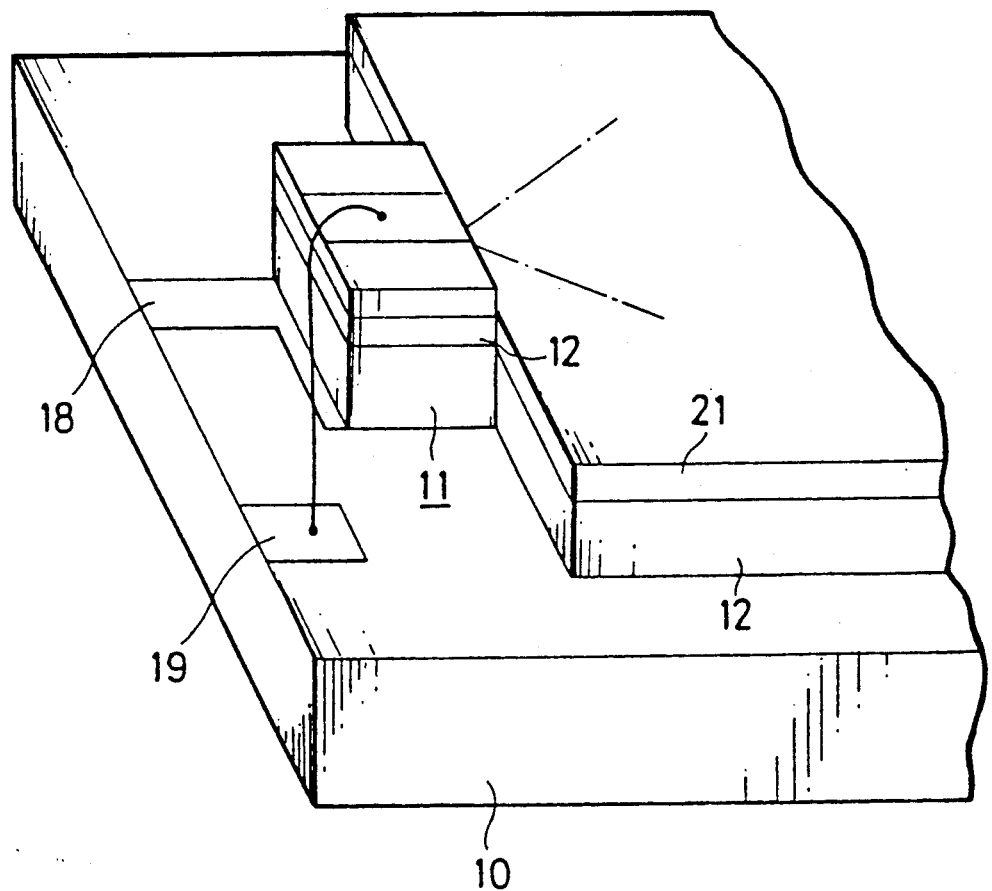
FIG. 2 is a perspective view showing an optical coupling portion between a semiconductor laser and an optical waveguide layer.

The semiconductor laser 11 is coupled to the waveguide layer 21 on the substrate 12 by the butt edge coupling method according to the present embodiment. As seen on an enlarge scale in FIG. 2, the end face of the substrate 12 to be coupled is optically polished, and the active layer 12 of the laser 11 and the waveguide layer 21 are at the same level as opposed to each other end to end. With the substrate and laser 11 thus positioned, the laser 11 is fixed to an electrode pad 18. The laser beam emitted by the laser 11 spreads out within the waveguide layer 21. Since the active layer of the laser 11 and the waveguide layer 21 are similar in the field distribution of light therein, this mode of coupling has the advantage of being highly efficient and eliminating the need to use some special coupling means. The base 10 serves also as a heat sink for the semiconductor laser 11.

(3) Collimating Lens

Examples of collimating lenses for use on the waveguide layer include a Fresnel lens, Bragg grating lens, Luneburg lens, geodesic lens, etc.

Figure 3:
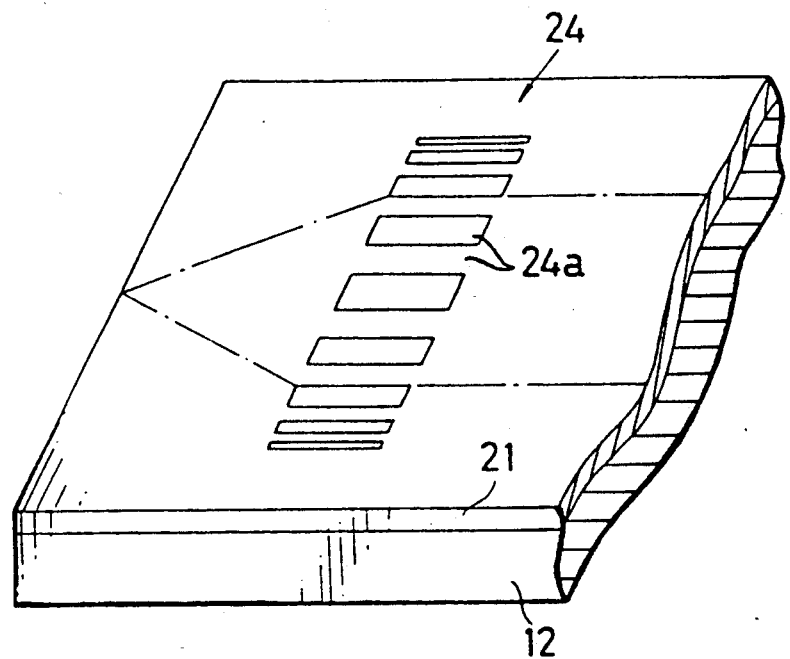
FIG. 3 is a perspective view showing a Fresnel grating lens.

FIG. 3 shows a Fresnel lens 24. Projections and recesses having a decreasing width away from the optical axis (i.e. chirped grating 24a) or a chirped refractive index distribution is formed on the waveguide layer 21.

The projections and recesses 24a are formed, for example, by the following manner. The layer 21 is spin-coated with a photoresist, then exposed to light using a pattern identical with the pattern of projections and recesses to be formed, and thereafter developed, whereby the resist is removed from the portions providing the projections. For example, glass is sputtered on the surface. Finally, the resist is completely removed, leaving projections of sputtered glass on the layer 21, the remaining portions corresponding to the recesses. Thus, the projections and recesses 24a are formed eventually.

When a refractive index distribution is to be produced, the layer is formed with the above-mentioned resist pattern and further with a Ti film for example, thereon. Then a Ti pattern is formed by the lift-off method, such that the Ti film remains only at the portions corresponding to the projections. The Ti is then thermally diffused to give an increased refractive index to the Ti-doped portions, forming a refractive index distribution in the same pattern as the projections and recesses in FIG. 3. The portions corresponding to the projections are higher in refractive index.

Figure 4:
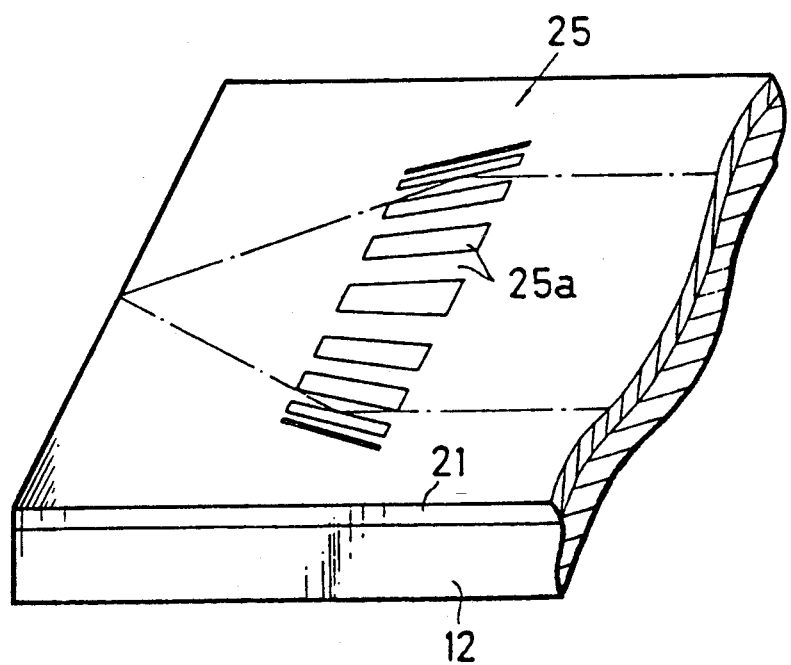
FIG. 4 is a perspective view showing a Bragg grating lens.

FIG. 4 shows a Bragg grating lens 25. The waveguide layer 25 is formed thereon with a refractive index distribution, or projections and recesses 25a at a larger angle with the optical axis with an increase in the distance from the axis. The lens 25 is prepared by the same method as the Fresnel lens 24.

FIG. 5 shows a Lunebury lens 26. It is a circular thin film of high refractive index formed on the waveguide layer and having a thickness which is largest in the center and progressively decreases toward the periphery.

The lens 26 is formed, for example, by disposing a mask having a circular opening above the layer 21 and sputtering glass or the like from thereabove onto the layer. The substance sputtered through the circular opening and directed toward the layer 21 spreads out to form a thin film having a decreasing thickness toward the periphery.

FIG. 6 shows a geodesic lens 27. Before the waveguide layer 21 is formed, a concavity is formed on the surface of the layer 21, and the layer 21 formed along the concavity.

(4) Coupling Lens

The coupling lens 23 shown in FIG. 1 is a two-dimensional focusing grating coupler having the function of emitting light and the function of focusing the light two-dimensionally. The lens comprises circular arc projections and recesses arranged at a decreasing spacing toward the direction of travel and providing a grating. The grating coupler is formed also by the same method as the Fresnel lens.

FIG. 7 shows another example of coupling lens 23 which comprises a Fresnel grating lens 28 (having the same structure as the Fresnel lens 24) and a chirped grating coupler 29. Generally, the Fresnel lens has the function of converting light spreading out from a point into a beam of parallel rays and the function of converging such a beam of parallel rays. The grating lens 28 is used for converging a beam of parallel rays within the waveguide 21. The grating coupler 29 comprises straight projections and recesses (grating) arranged at a decreasing spacing toward the direction of travel of light and functions to emit the light propagating through the layer 21 and to one-dimensionally converge the light to a straight line. The light propagating through the layer 21 is converged widthwise by the grating lens 28, so that when the focal point of the grating lens 28 and the focal point of the grating coupler 29 are at the same point P, the light emerging from the layer 21 focuses at the point P.

For the sake of simplification, the projections and recesses providing a grating and shown in FIGS. 1 and 7 are represented by simple lines having no width.

(5) Detection of Focusing Errors

The data record surface of the optical disc is formed along the track thereof with pits representing digital data according to the length or position thereof. FIG. 8 shows the position relation between a disc 81 and the pick-up head 9 in section taken along the circumferential direction of the disc 81. The laser beam emerging from the coupling lens 23 is reflected from the data record surface (the portion including the pit 82 in FIG. 8) and impinges on the light receiving unit 30. For a better understanding, the photodetectors 31 to 34 are shown in FIG. 8 as slightly projected. FIG. 9 shows the area where the light reflected from the disc 81 impinges on the light receiving unit 30.

With reference to FIG. 8, the disc 81 indicated in solid line is at an optimum distance from the pick-up head 9. It is seen that the emergent beam is properly focused on the disc 81. The area of the light receiving unit 30 irradiated with the reflected beam is indicated at Q. This area Q covers the central photodetectors 31 and 32, while the other photodetectors 33 and 34 receive no reflected beam.

FIG. 8 further shows in broken lines positions of the optical disc 81 when proper focusing i not realized because the distance between the disc 81 and the pick-up head 9 is larger or smaller than the proper distance. When the distance is smaller (displacement of $-\Delta d$), the area Q1 of irradiation with the reflected light shifts toward the photodetector 33. Since the photodetector 33 is connected to the negative side of a differential amplifier 71, with the photodetector 34 connected to the positive side thereof, the output value of the amplifier in this case is negative and represents the displacement $-\Delta d$.

If the distance between the disc 81 and the head 9 is larger (displacement of $+\Delta d$), the area Q2 of irradiation with the reflected light shifts toward the photodetector 34. The output value of the amplifier 71 is positive and represents the displacement $+\Delta d$.

In this way, the output from the differential amplifier indicates whether the beam emerging from the head 9 is properly focused. If there is a focusing error, the output indicates the direction and extent of the error. When there is no focusing error, the output of the amplifier 71 is zero.

(6) Detection of Tracking Errors

FIG. 10 shows the pit 82 of the disc 81 and the photodetectors 31 and 32 of the light receiving unit 30 as arranged on a plane. In other words, the photodetectors 31 and 32 are seen through the disc 81 in the direction of its plane. A differential amplifier 72 is illustrated to show that it is electrically connected to the photodetectors 31 and 32. FIG. 10(A) shows that the laser beam spot P is properly positioned at the center of the track (pit 82) with respect to its width. FIGS. 10(B) and (C) show that the spot P is slightly displaced from the track (pit 82) widthwise thereof, hence tracking errors. In these cases, it is assumed that the beam is properly focused.

When the laser spot P impinges on the data record surface of the disc 81, the intensity of the reflected light is modulated by the presence of the pit 82. This phenomenon is explained as follows. The spot is slightly larger than the width of the pit 82, so that there exist light reflected at the bottom surface of the pit 82 and light reflected at other portion. Since the depth of the pit 82 is set to about $\frac{1}{4}\lambda$ ($\lambda$ = the wavelength of the laser beam), the two kinds of reflected light offset each other owing to a phase difference of $\pi$ therebetween to result in a reduced light intensity. Another explanation is that scattering of light occurs at the edge of pit 82 to reduce the intensity of the reflected light to be received. At any rate, the presence of the pit 82 reduces the intensity of the light to be received by the unit 30.

The photodetectors 31 and 32 are separately positioned on opposite sides of the optical axis. When the center of the laser spot P is positioned at the widthwise center of the pit 82, the amounts of light impinging on the photodetectors 31 and 32 are equal, and the output of the differential amplifier 72 is zero.

When the laser spot P shifts toward the left side of the pit 82 as seen in FIG. 10(B), a larger amount of light impinges on the photodetector 31, causing the amplifier 72 to produce a positive output. Conversely, if the laser spot P shifts toward the right side of the pit 82 as shown in FIG. 10(C), the amplifier 72 produces a negative output.

In this way, the output of the differential amplifier 72 indicates whether the beam spot P is properly positioned with respect to the track of the disc 81, and further whether the error, if detected, is leftward or rightward.

(7) Focusing and Tracking Drive Mechanisms

Figure 11:
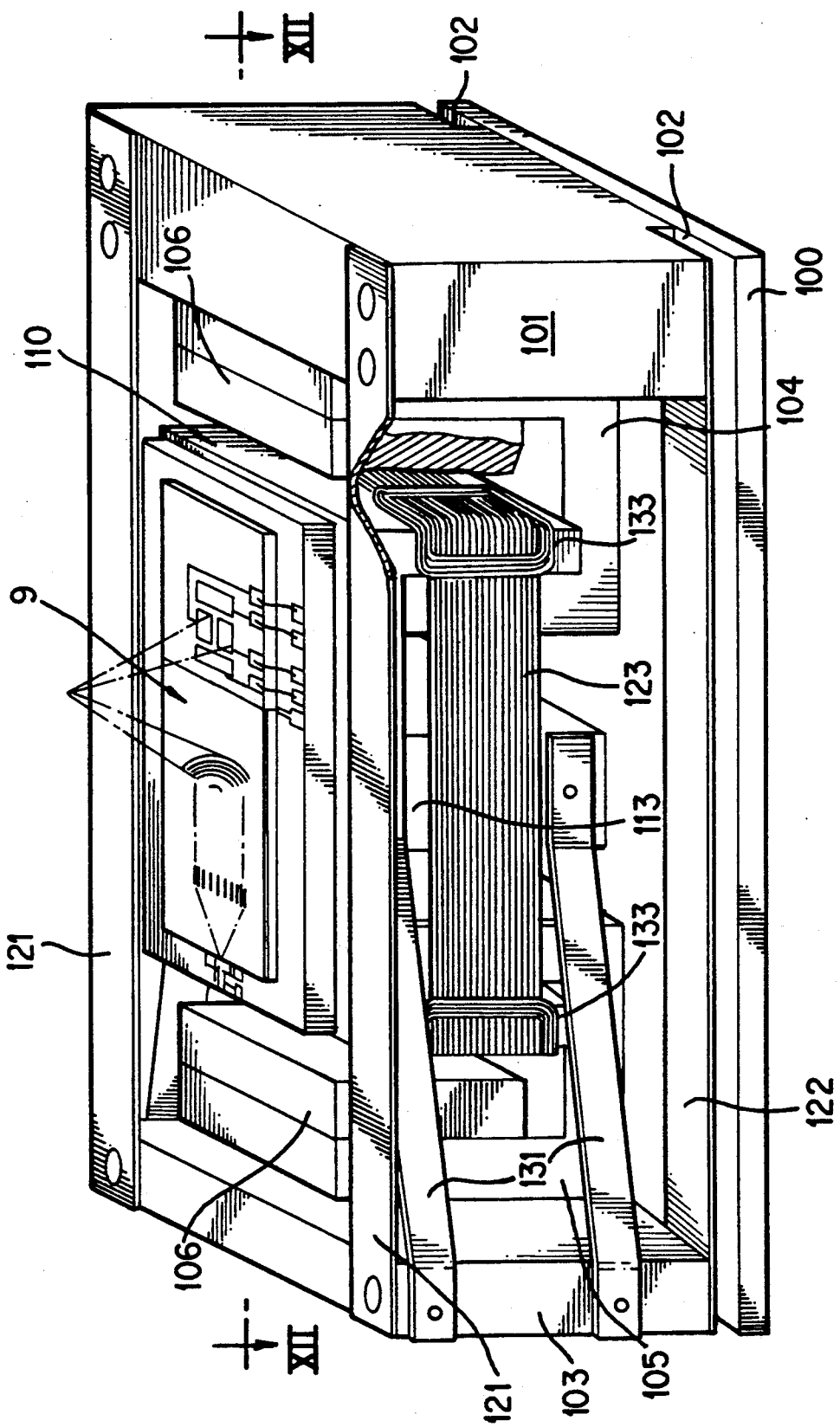
FIG. 11 to FIG. 13 show focusing and tracking drive mechanisms, FIG. 11 being a perspective view, FIG. 12 being a view in section taken along the line XII—XII in FIG. 11, and FIG. 13 being a plan view showing the mechanisms with the pick-up head removed.
Figure 12:
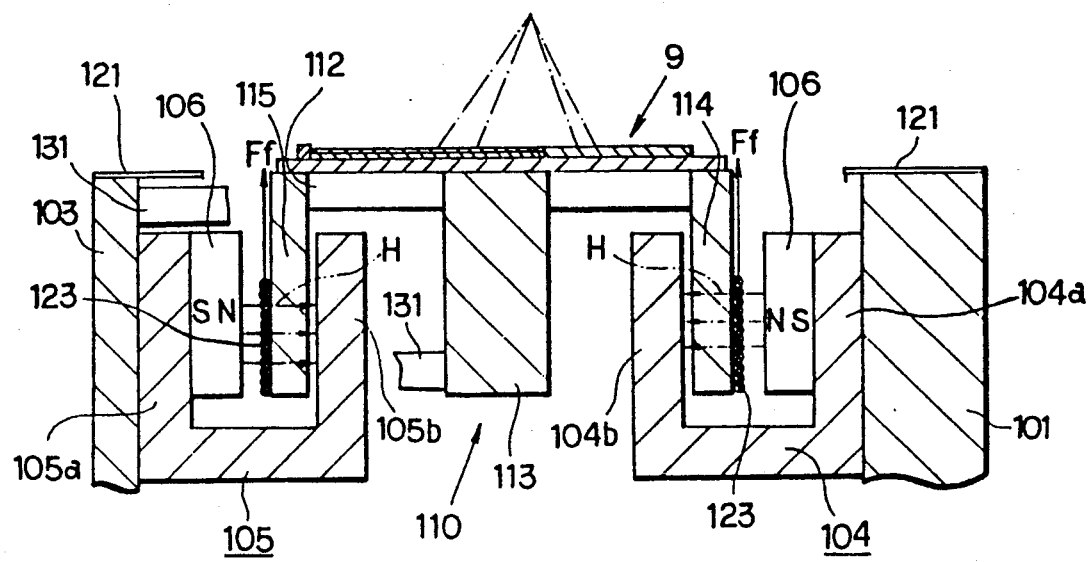
Figure 13:
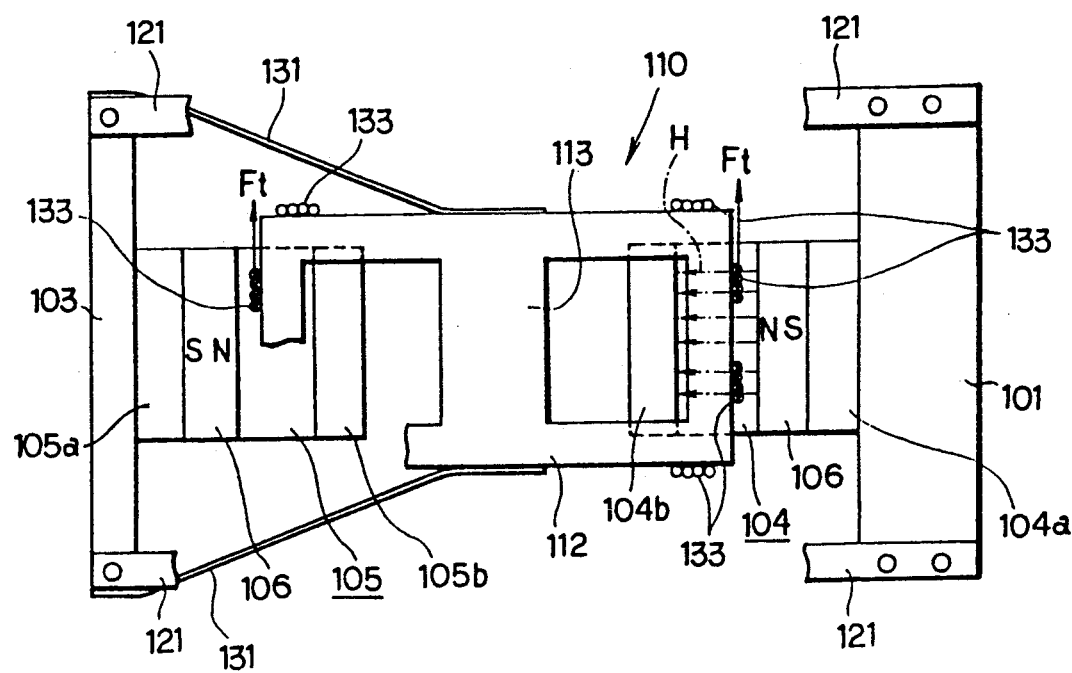

FIG. 11 to FIG. 13 show these drive mechanisms.

A support plate 100 is provided at its one end with an upstanding support member 101. The lower end of the support member 101 is cutout as indicated at 102 at its opposite sides. A movable member 103 is positioned above the other end of the support plate 100. Upwardly or downwardly bendable four plate springs 121, 122 are fixed, each at its one end, to the upper end and lower cutout (102) portions of the support member 101 at its opposite sides. The other ends of the springs are fixed to the upper or lower end of the movable member 103. Accordingly, the movable member 103 is supported by these plate springs 121, 122 on the support member 101 upwardly or downwardly movably.

A stage 110 carrying the pick-up head 9 comprises an upper rectangular frame 112, opposite legs 114, 115 extending downward from the opposite ends of the frame 112, and a central leg 113 extending downward from the central portion of the frame 112. The head 9 is fixedly mounted on the rectangular frame 112. Laterally resiliently bendable four plate springs 131 are secured, each at its one end, to upper or lower portions of the movable member 103 at opposite sides thereof, and the other ends of the springs 131 are secured to upper or lower ends of the central leg 131 of the stage 110 at either side of thereof. By means of the plate springs 131, the stage 110 is supported laterally movably (i.e. sidewise in FIG. 10). Consequently, the stage 110 is free to move upward or downward (for focusing) and laterally (tracking).

The support plate 100, support member 101, movable member 103 and stage 110 are made of a nonmagnetic material, e.g., plastics.

Yokes 104, 105 are fixed to the support member 101 and the movable member 103 on the inner side thereof. The yoke 104 comprises a vertical portion 104a fixed to the support member 101, another vertical portion 104b spaced apart therefrom and a horizontal portion interconnecting the two portions 104a, 104b at their lower ends. The yoke 105, which is exactly identical with the yoke 104 in shape, comprises two vertical portions 105a, 105b which are spaced apart by a distance.

A permanent magnet 106 is fixed to the inner surface of each of the vertical portions 104a, 105a of the yokes 104, 105, the S pole of the magnet being adjacent to the inner surface, for example. The legs 114, 115 of the stage 110 extend into the spaces between the other vertical portions 104b, 105b and the permanent magnets 106 without contacting the vertical portion or the magnet.

A focusing drive coil 123 is horizontally wound around the two legs 114, 115 of the stage 110. Each of the legs 114, 115 is partly provided with tracking drive coils 133 opposed to the permanent magnet 106 and having a vertically extending portion.

The focusing drive mechanism is best seen in FIG. 12. As indicated in broken lines, the magnetic fluxes H produced by the magnets 106 are directed toward the yoke vertical portions 104b, 105b. When a drive current, for example, toward the plane of FIG. 12 is passed through the horizontally wound coil 123 across the magnetic field, an upward force Ff occurs to move the stage 110 upward. The amount of movement of the stage 110 is adjustable according to the value of the current through the coil 123. Thus, focusing control is realized by changing the direction of the drive current, adjusting the current value or turning on or off the power supply in response to the output signal from the differential amplifier 71.

The tracking drive mechanism is best shown in FIG. 13. When a drive current, for example, toward the plane of FIG. 13 (downward in FIG. 11) is passed through the portions of the coils 133 extending vertically across the magnetic field H, an upward (lateral in FIG. 11) force Ft occurs in FIG. 13, moving the stage 110 in the same direction. Tracking control can be realized by turning on or off the power supply to the coils 133, or changing the direction of the current or, when required, adjusting the current value in response to the output signal from the differential amplifier 72.

(8) Three-Beam System

Figure 14:
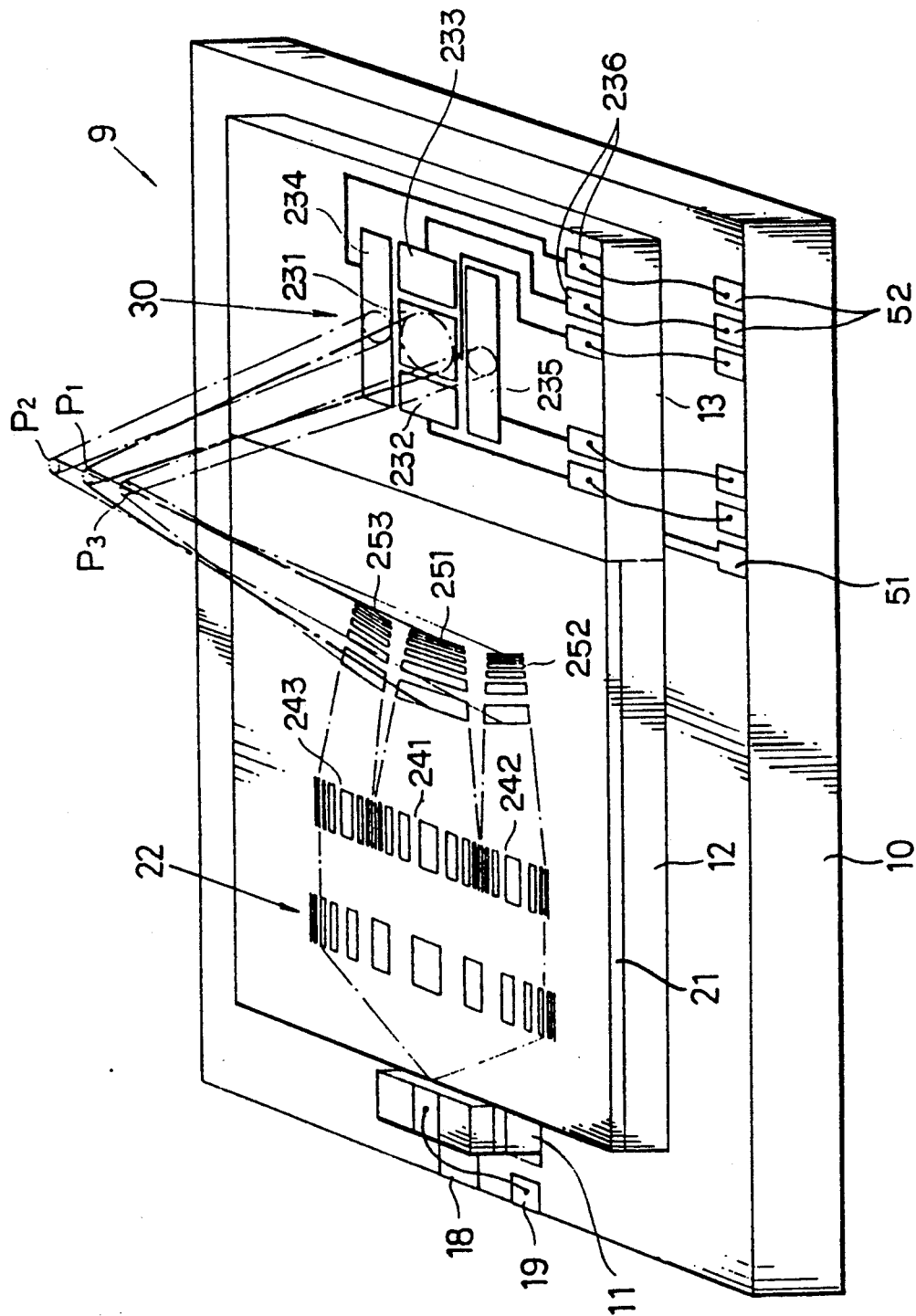
FIG. 14 is a perspective view showing another example of optical pick-up head (three-beam type)

FIG. 14 shows another embodiment of optical pickup head.

The coupling lens shown causes the laser light propagating through a waveguide 21 to emerge therefrom obliquely upward as separated into three beams and two-dimensionally focuses these beams at three different points P1 to P3. The coupling lens comprises three Fresnel grating lenses (Fresnel lenses) 241 to 243 arranged in a row across the path of propagation of a laser beam of parallel rays formed by a collimating lens 22, and chirped grating couplers 251 to 253 provided on the path of propagation of the three beams divided and focused by the lenses 241 and 243. Each of the grating lenses 241 to 243 and each of the grating couplers 251 to 253 are identical with the grating lens 28 and the grating coupler 29 shown in FIG. 7, respectively. The central portion of light propagating through the layer 21 is converged widthwise by the grating lens 241, so that if the focal point of the grating lens 24 and the focal point of the grating coupler 251 are at the same point P1, the emergent light from the layer 21 is focused at the single point P1. Similarly, the beams emerging from the grating lenses 252, 253 are focused at the points P2, P3, respectively. These laser spots P1 to P3 are about 1 μm in diameter and are spaced apart by a distance of about 20 μm. The central laser spot P1 is used for reading data from optical discs and for detecting focusing errors. The side laser spots P2, P3 are used for detecting tracking errors. These focused spots P1 to P3 are on the same plane (disc data record surface) and are substantially aligned.

The light receiving unit 30 shown is so disposed as to receive the beams reflected obliquely downward from the positions of the spots P1 to P3. The unit 30 comprises five independent photodetectors 231 to 235. The central photodetector 231 is used for reading data and receives the reflected beam from the point P1. The photodetectors 232, 233 in front and rear of the photodetector 231 are used for detecting focusing errors. The photodetectors 234, 235, which are used for detecting tracking errors as positioned on opposite sides of the photodetector 231, receive the beams reflected from the points P2, P3.

Figure 15:
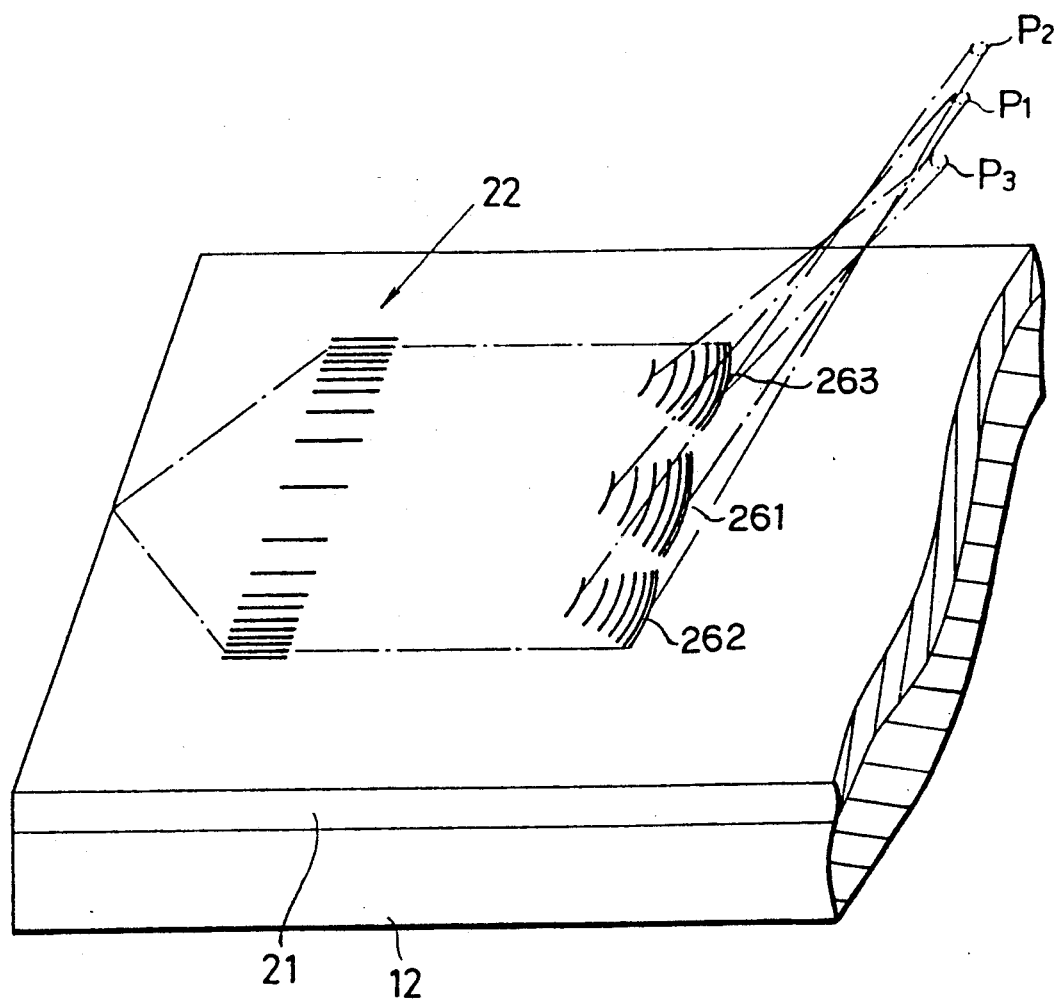
FIG. 15 is a perspective view showing another example of coupling lens of the three-beam type.

FIG. 15 shows another example of coupling lens. Three two-dimensional focusing grating couplers 261 to 263 are arranged on the path of propagation of a beam of parallel rays emerging from a collimating lens 22. These couplers are identical with the grating coupler 23 shown in FIG. 1.

Focusing errors are detected by the photodetectors 232, 233 in the same manner as by those shown in FIG. 9.

Figure 16:
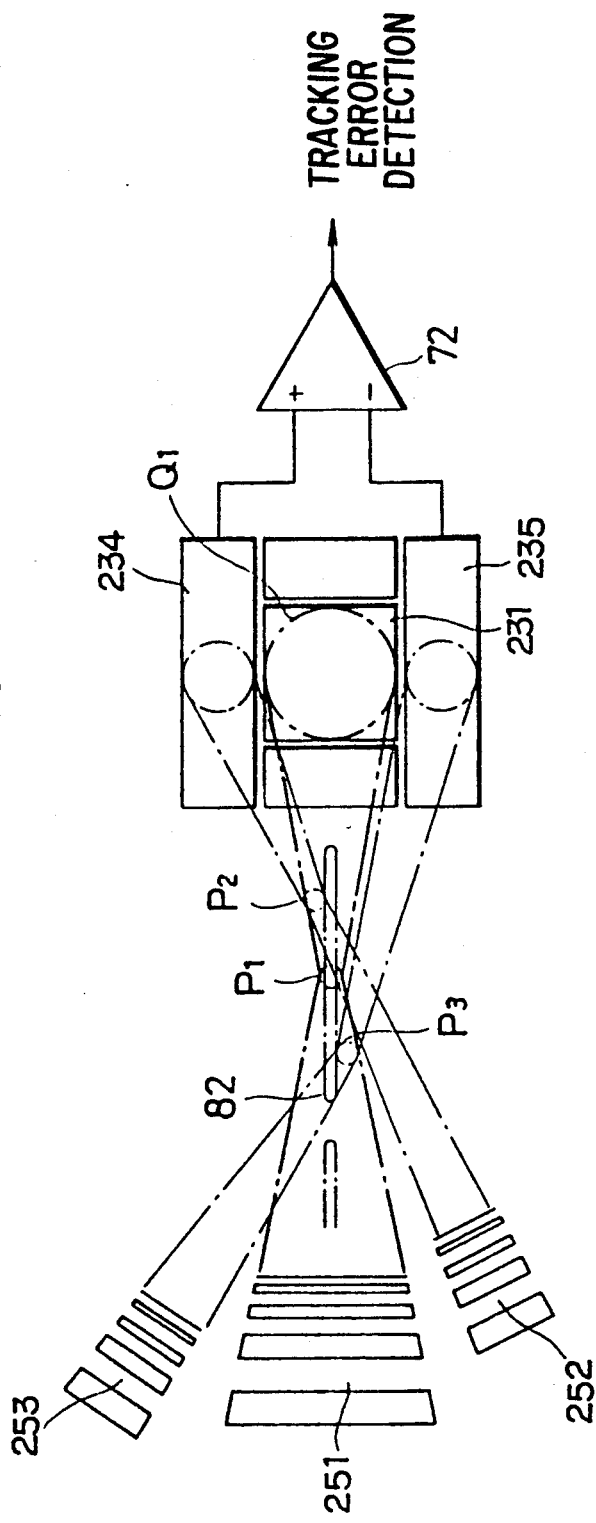
FIG. 16 and FIG. 17 are diagrams showing the principle for detecting tracking errors in the three-beam system, FIG. 16 showing an arrangement wherein the circumferential direction of the optical disc is approximately in agreement with the direction of the optical axis, and FIG. 17 showing an arrangement wherein the diametrical direction of the optical disc is approximately in agreement with the direction of the optical axis.
Figure 17:
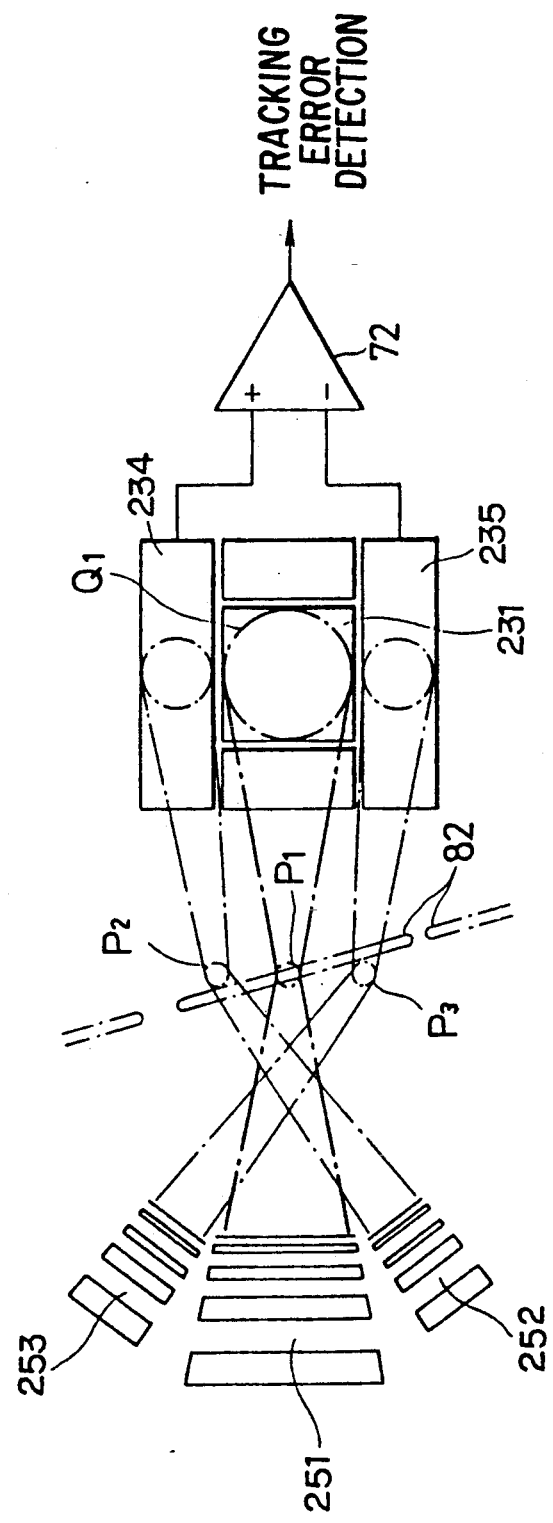

FIG. 16 and FIG. 17 show the principle for detecting tracking errors. FIG. 16 shows the case wherein the circumferential direction of the optical disc is approximately in agreement with the optical axis. FIG. 17 shows the case wherein the radial direction of the disc is approximately in agreement with the axial direction.

While proper tracking control is achieved, the central laser spot F1 is at the center of width of the pit 82. The other two spots P2, P3 are away from the center. Although the spots P2, P3 may be partly positioned at the pit 82, the displacements of the spots P2, P3 from the pit 82 are equal to each other. The photodetectors 234, 235 receiving the beams reflected from the spots P2, P3 are connected to a differential amplifier 72. If the spot P1 deviates from the pit 82, one of the other spots P2, P3 are moves away from the pit 82, while the other spot moves toward the widthwise center of the pit 82. Consequently, the amounts of light received by the photodetectors 234, 235 differ, causing the amplifier 72 to produce a positive or negative voltage according to the direction of the deviation, and the output voltage value represents the degree or extent of the deviation.

The focusing and tracking drive mechanisms shown in FIGS. 11 to 13 are usable also for this embodiment.

Focusing and tracking control can be accomplished also by utilizing an electrooptical effect. For example, the waveguide 21 (as well as the substrate 12) is formed from a material having such effect (e.g. LiNbO₃), or the grating lenses 241 to 243 or the grating couplers 251 to 253 are provided with a thin film having an electrooptical effect (e.g. film of ZnO or AlN), with electrodes formed at opposite sides of these lenses and couplers. By varying the voltage to be applied across the electrodes, the focal distance of the lenses or couplers is adjustable for focusing or tracking control. Further it is possible to deflect the light beam propagating through the waveguide 21 utilizing an electrooptical effect for tracking control. The beam can be deflected by resorting to the interaction of light and SAW.

(9) Electrical Control of Focusing and Tracking

Figure 18:
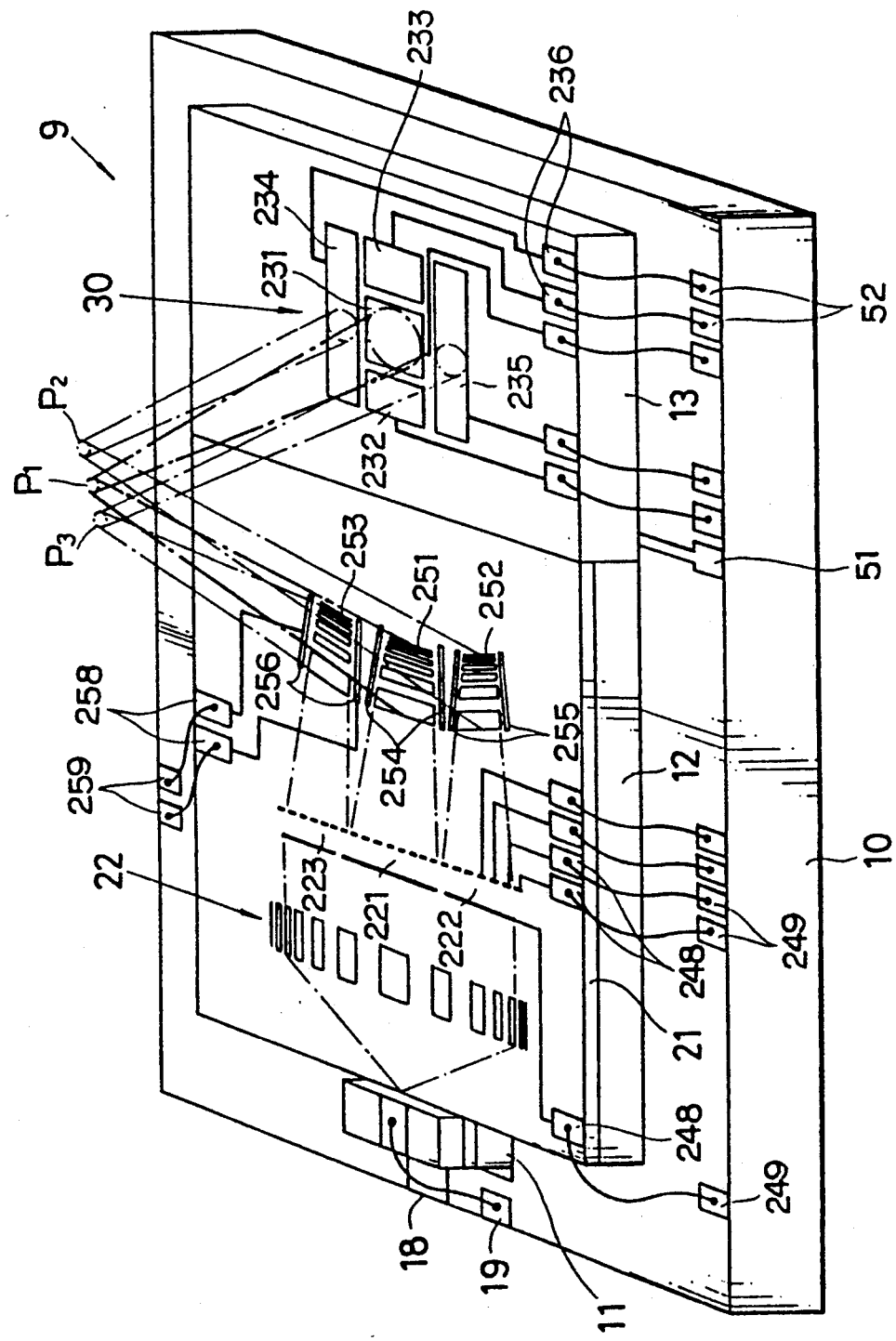
FIG. 18 is a perspective view showing an optical pick-up head adapted for focusing and tracking control utilizing an electrooptical effect.

FIG. 18 shows another embodiment of optical pickup head 9.

With this embodiment, the substrate 12 is made, for example, of LiNbO₃ crystal having an electrooptical effect. A waveguide layer 21 is formed on the upper surface of the substrate 12 by thermally diffusing Ti. In place of the grating lenses 241 to 243, control lenses 221 to 223 are provided on the substrate 12. Grating couplers 251 to 253 per se are the same as those shown in FIG. 14. The Si substrate 13 is provided with a light receiving unit 30 which is similar to the one already shown.

Figure 19:
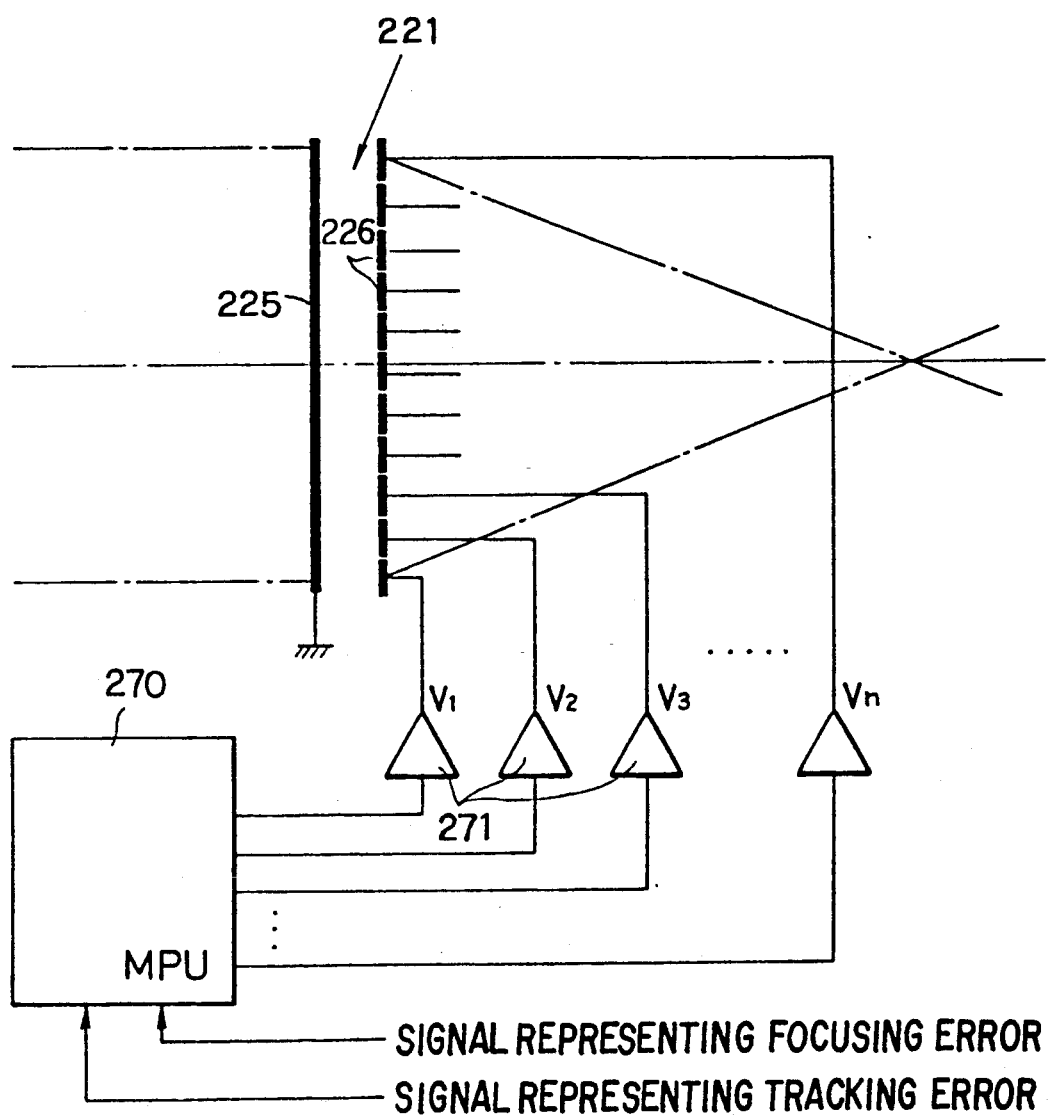
FIG. 19 is a diagram showing the structure of a control lens and a control unit therefor.

FIG. 19 shows an example of control lens 221, which is similar to the other lenses 232 and 223 in structure.

A common electrode 225 is provided across the path of propagation of light perpendicular thereto. A multiplicity of electrodes 226, electrically insulated from one another, are provided in parallel with the common electrode 225 at a distance therefrom. These electrodes 225, 226 are formed on the waveguide 21, for example, by the vacuum evaporation or sputtering of Al. The pitch of the electrodes 226 (center-to-center distance between each two adjacent electrodes 226) is several tens of microns to about 100 microns. When the propagating beam of parallel rays has a width, for example, of 5 mm, about fifty electrodes 226 are arranged in a row.

With reference to FIG. 18, the substrate 12 is provided thereon with electrodes 248 connected to the electrodes 225, 226 by a wiring pattern. The electrodes 248 are connected to electrodes 249 on the base 10 by wire bonding. FIG. 18 shows only some of the electrodes 248, 249.

As seen in FIG. 19, across the electrodes 225 and 226 constituting the control lens 221, a drive circuit 271 applies voltages V1 to Vn which vary from electrode to electrode (226). These voltages V1 to Vn are produced by a microprocessor MPU in response to focusing error and tracking error detection signals.

Figure 20A:
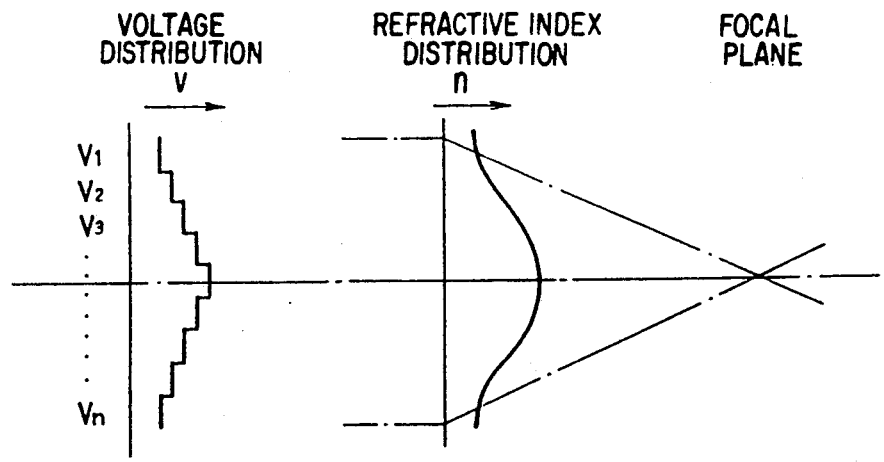
FIG. 20, consisting of (A)-(C), is a diagram showing the operation of the control lens.

FIG. 20 shows the operation of the control lens. Since the substrate 12 is made of a material having an electrooptical effect, the voltages applied across the electrodes 225, 226 produces varying refractive indexes at the corresponding portions. As seen in FIG. 20(A), voltages Vl to Vn which are higher toward the center of path of propagation of the beam (i.e. toward the optical axis) and are symmetrical with respect to the optical axis are applied across the electrodes, producing a distribution of refractive indexes n which are higher toward the center and symmetric with respect to the optical axis, whereby a convex lens of the refractive index distribution type is provided. Accordingly, the beam incident on the control lens is focused at a point which is determined by the index distribution.

Figure 20B:
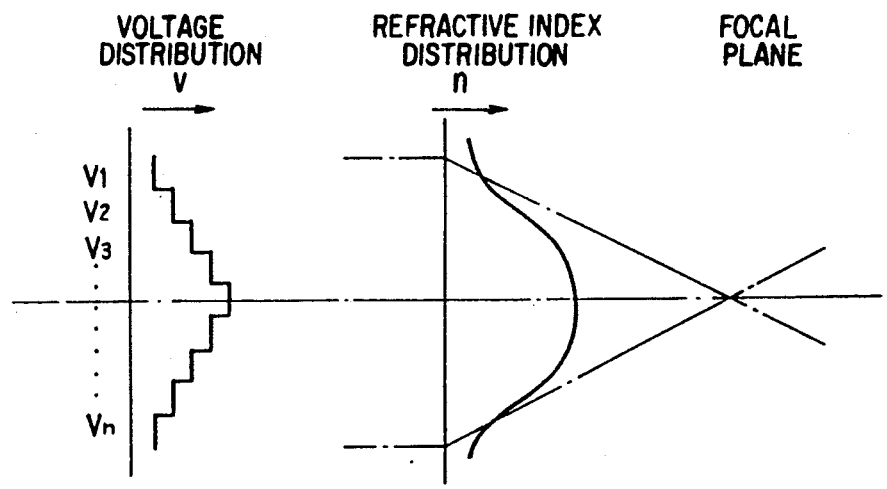

When the voltages applied are increased further to still higher levels toward the optical axis, a distribution of more markedly varying refractive indexes is obtained as seen in FIG. 20(B) to give a shorter focal distance. Conversely, if the voltages are made lower, the focal distance becomes shorter. In this way, the position where the light propagating through the waveguide 21 is to be focused (one-dimensional focal position for the light incident on and emergent from the waveguide 21) is controllable by adjusting the voltages to be applied across the electrodes 225, 226.

Figure 20C:
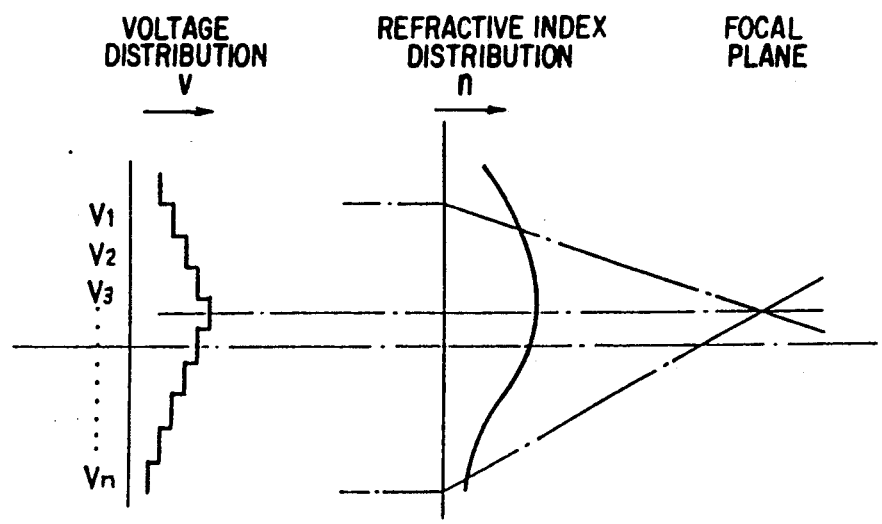

In FIGS. (A) and (B), the applied voltage distribution (refractive index distribution) is symmetric with respect to the optical axis, so that the focal point is positioned on the optical axis. If the highest voltage is applied to the electrode at a position slightly away from the optical axis as shown in FIG. 20(C), the focal point is positioned also away from the axis. Thus, by shifting the voltage distribution widthwise of the beam, the focal point is shiftable in the same direction. In this way, tracking control is achievable by adjusting the direction and amount of shift.

Figure 21:
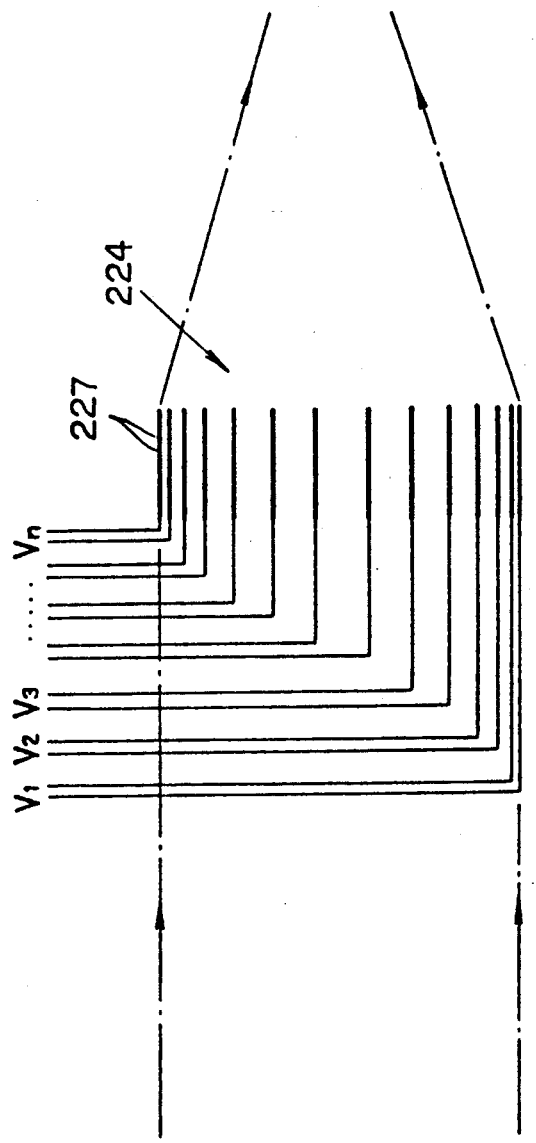
FIG. 21 is a diagram showing the structure of another example of control lens.

FIG. 21 shows a Fresnel control lens 224 which comprises a multiplicity of electrodes 227 extending in parallel with the direction of propagation of light and arranged at a spacing which decreases away from the optical axis. A voltage is applied across each pair of electrodes to give an increased refractive index. Thus, the lens is equivalent to the Fresnel lens already described. The focal position is shiftable along the optical axis and in a direction perpendicular thereto by suitably adjusting the voltages Vl to Vn.

It is also possible to provide a control lens of the refractive index distribution type by arranging a multiplicity of electrodes in parallel with the optical axis as seen in FIG. 21. In this case, the electrodes are arranged equidistantly, and voltages are so applied as to produce a potential difference between each two adjacent electrodes.

As seen in FIG. 18, paris of electrodes 254 to 256 are formed at opposite sides of the grating couplers 251 to 253. By applying a voltage across the electrodes 254, the portion where the grating coupler 251 is provided is given an altered refractive index and therefore an altered focal distance. Accordingly, the focal distance for the laser spot P1 is adjustable one-dimensionally. The laser spot P1 is formed by focusing the beam two-dimensionally in directions perpendicular to each other by the control lens 221 and the rating coupler 251. Focusing in one direction is adjustable by voltage application across the electrodes 225 and 226 of the control lens 221. Focusing in the other direction is adjustable by the voltage application across the electrodes 254 for the grating coupler 251. Thus, focusing control can be realized tow-dimensionally for the spot P1. The same is true of the other spots P2 and P3. Some of the electrodes for applying voltage to the electrodes 254 to 256 are indicated at 258, 259 in FIG. 18. The electrodes 254 may be provided in front and rear of the grating 251 in parallel therewith.

The electrical focusing control and tracking control described can be applied also to the pick-up head of the single-beam type shown in FIG. 1.

(10) Further Developed Embodiments

Figure 22:
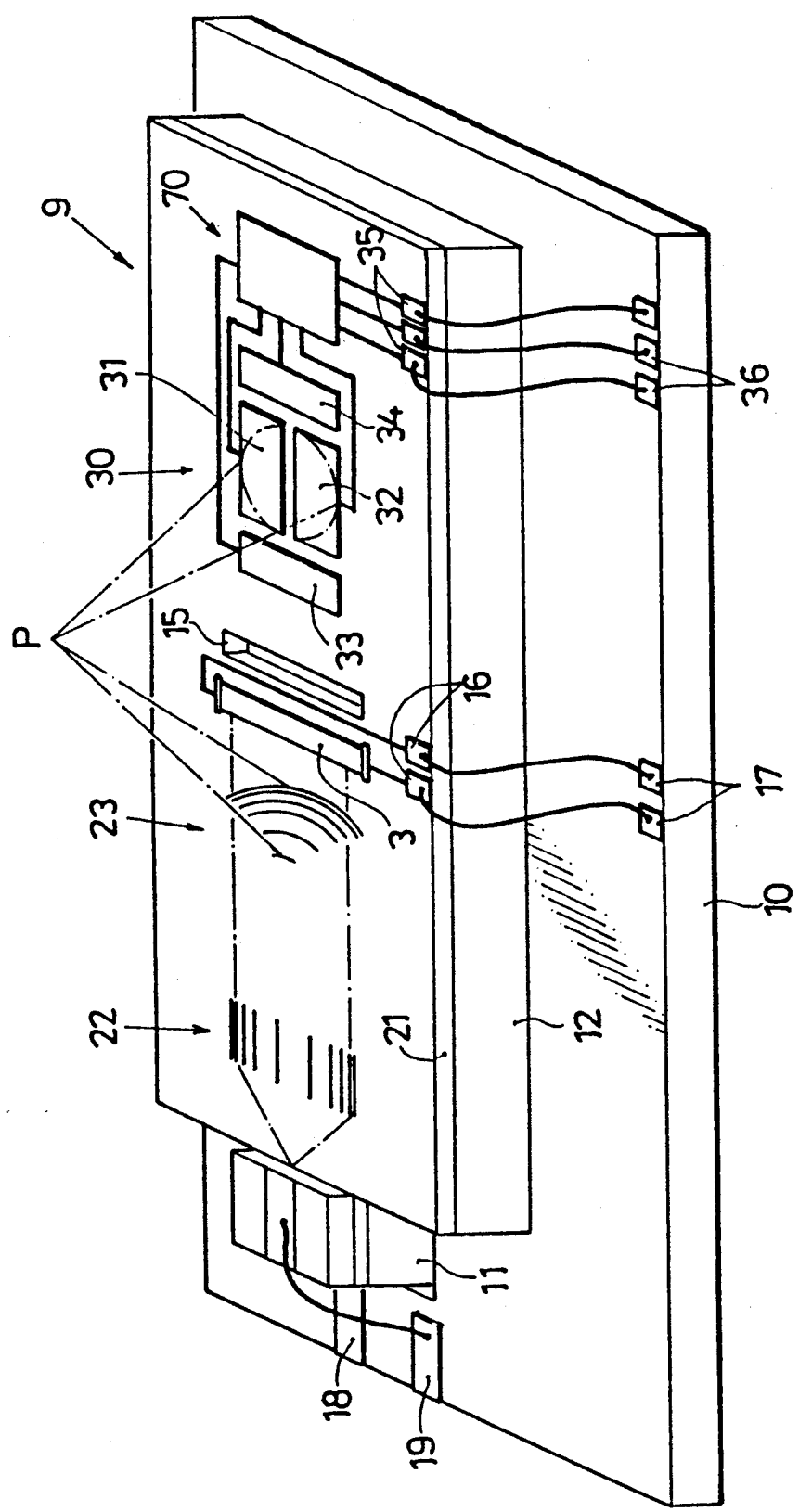
FIG. 22 is a perspective view a further developed example of optical pick-up head.

FIG. 22 shows an example of optical pick-up head similar tot he one shown in FIG. 1 but an improved one.

The substrate 12 is made of Si crystal and formed with a waveguide layer 21 over the entire surface thereof. Provided on the optical waveguide 21 are a collimating lens 22, coupling lens 23, leak light sensor 3, leak light blocking groove 15, light receiving unit 30 and amplifier circuit 70 which are arranged in the order mentioned.

The light receiving unit 30 is fabricated in the following manner. The portions where photodetectors 31 to 34 are to be formed are covered with a mask when the buffer layer and waveguide layer 21 are formed so as not to form the layer 21 on these portions. An impurity substance is then diffused through the portions to produce PN junctions (photodiodes), whereby the photodetectors 31 to 34 are formed.

Figure 25:
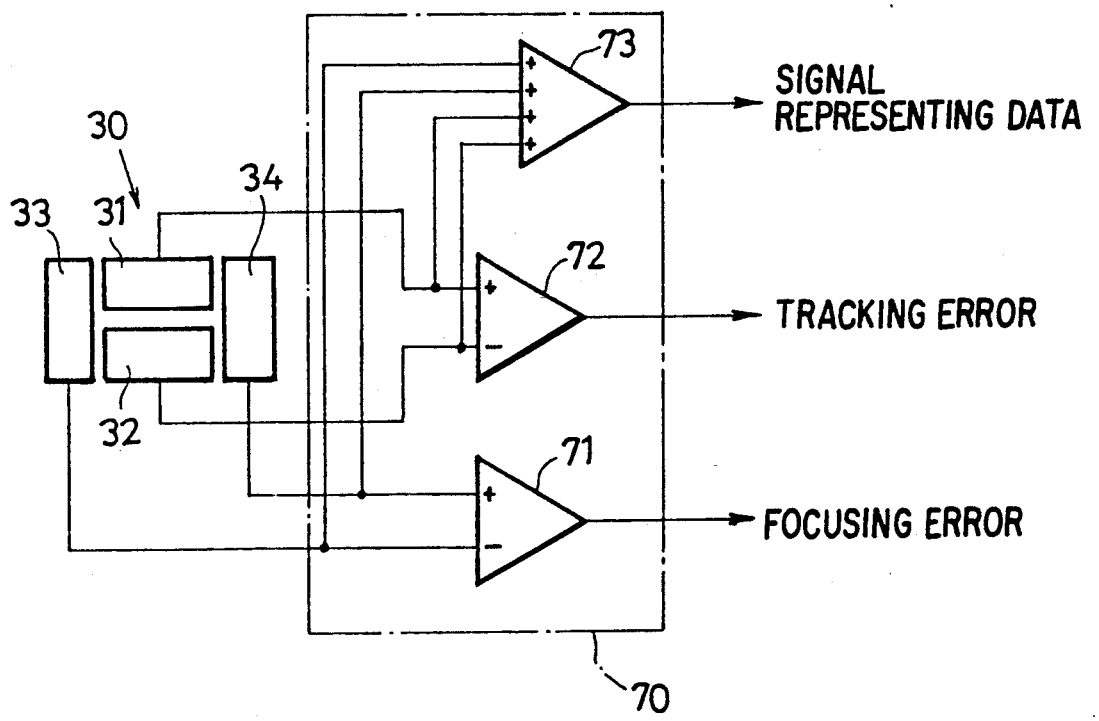
FIG. 25 is a circuit diagram showing the electric construction of an example of amplification circuit.

The amplifier circuit 70 is formed on the substrate 12 also by the IC fabrication process. The output signals from the photodetectors 31 to 34 are sent to the circuit 70 through a wiring pattern formed on the substrate 12. FIG. 25 shows the electric construction of the amplifier circuit 70 for illustrative purposes. The circuit 70 comprises a differential amplifier 71 for detecting focusing errors, a differential amplifier 72 for detecting tracking errors and a cumulative amplifier 73 for data representing signals. The signal produced from the circuit 70 is led from electrodes 35 formed on the substrate 12 to electrodes 36 on the base 10 through wire bonding. Since various detection signals are delivered upon amplification by the circuit 70, they are free of noise. The power supply for circuit 70 is connected thereto via suitable wiring and electrodes.

The whole light propagating through the waveguide layer 21 is not always emitted (air coupled) by the coupling lens 23, but there is a portion of light passing through the position of the lens 23 and leaking toward the light receiving unit 30 without being emitted. The leak light sensor 3 detects the intensity of the leak light. The variation in the intensity of light propagating through the layer 21 appears also as variation in the intensity of leak light, so that the intensity of light propagating through the layer 21 can be detected indirectly by detecting the intensity of leak light. The intensity signal obtained upon detection is fed back to the drive circuit (not shown) for the laser 11 to stabilize the light output of the laser 11. The sensor 3 is made of amorphous silicon (a-Si), CdTe, CdS or the like and is formed directly on the waveguide layer 21 by the CDV process, vacuum evaporation, sputtering or the like. The detection signal from the sensor 3 is led through a wiring pattern and electrodes 16 on the layer 21 and delivered from electrodes 17 on the base 10 through wire bonding.

The whole leak light from the layer 21 is not always consumed by the sensor 3. Since the light receiving unit 30 and the sensor 3 are formed on the same substrate 12, leak light passing through the portion of the sensor 3, if present, could be detected by the unit 30. This is more likely to occur when the photodetectors 31 to 34 are formed directly on the layer 21 as will be described later with reference to FIG. 23. The pick-up head would then operate erroneously.

The leak light blocking groove 15 is provided between the sensor 3 and the light receiving unit 30 to prevent light from propagating from the position of the sensor 3 toward the unit 30 by reflection and attenuation of light by the groove defining wall. The groove 15 is formed directly in the layer 21 on the substrate 12 by ion beam working, electron beam working or laser working. The groove 15 has a length larger than the width of the propagating beam hand has a depth nearly equal to the thickness of the waveguide layer 21.

Figure 23:
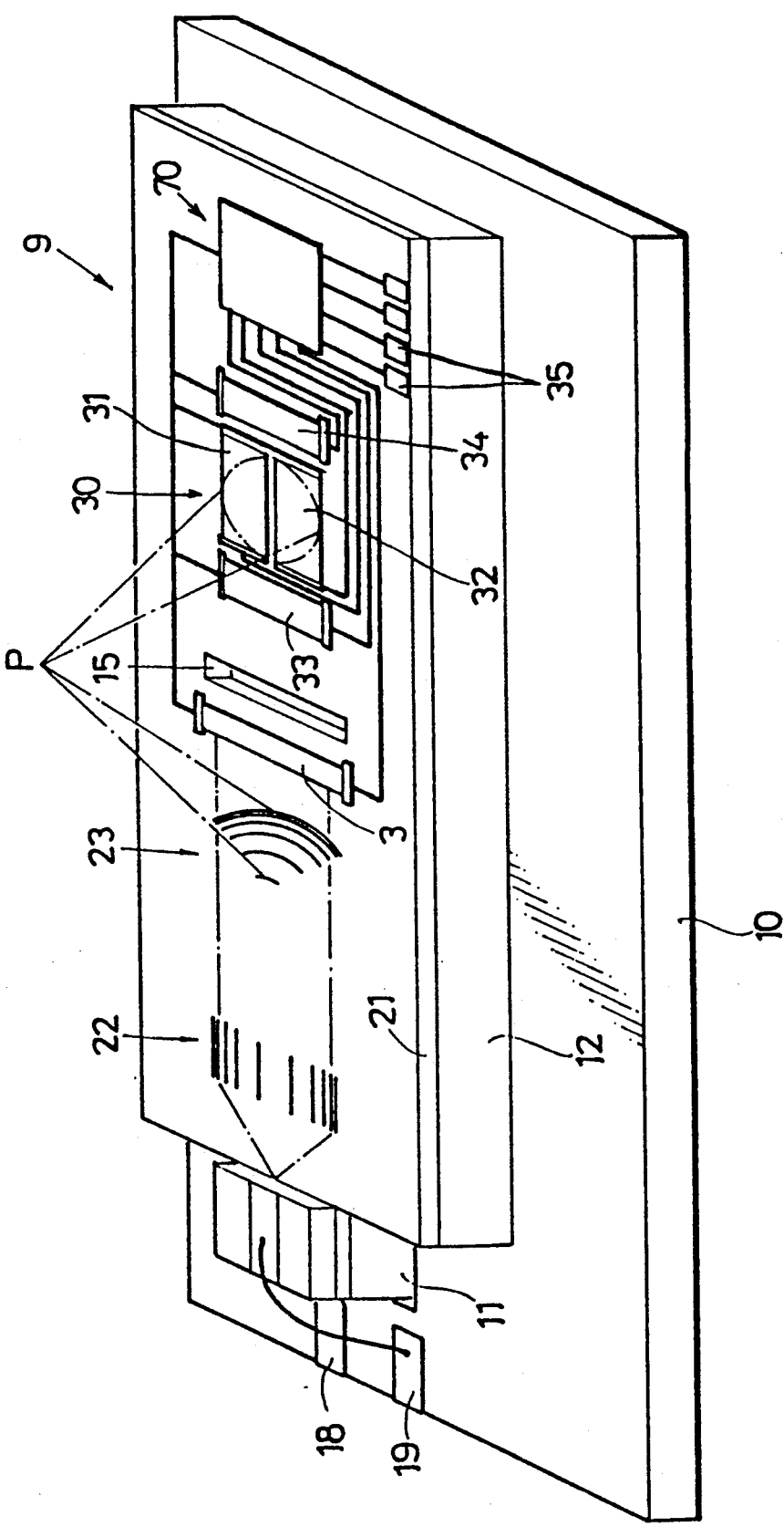
FIG. 23 and FIG. 24 are perspective views showing further developed examples of optical pick-up heads.

FIG. 23 shows another example of pick-up head 9, wherein photodetectors 31 to 34 are provided by forming four photovoltaic elements of amorphous silicon (a-Si) independently of one another, directly on the layer 21 by the CVD process. Not only the output signals from the photodetectors 31 to 34 but also the detection signal from the sensor 3 is fed to the amplifier circuit 70 via a wiring pattern. The circuit 70 includes an amplifier for the leak light detection signal. Accordingly, the circuit 70 produces, upon amplification, data representing signals, focusing error detection signals, tracking error detection signals and further leak light detection signals.

Because the light receiving portion 30 can be formed in an accurately set position as by the CVD process with use of a mask, the device can be fabricated without the necessity of optically aligning the components during assembly, and the simple construction assures improved productivity.

Although the waveguide layer 21 extends to the positions of the unit 30 and the circuit 70, the layer 21 can be made to extend to a position between the sensor 3 the groove 15 without forming the layer 21 beneath the unit 30 and the circuit 70, unlike the arrangement shown in FIGS. 22 and 23.

Figure 24:
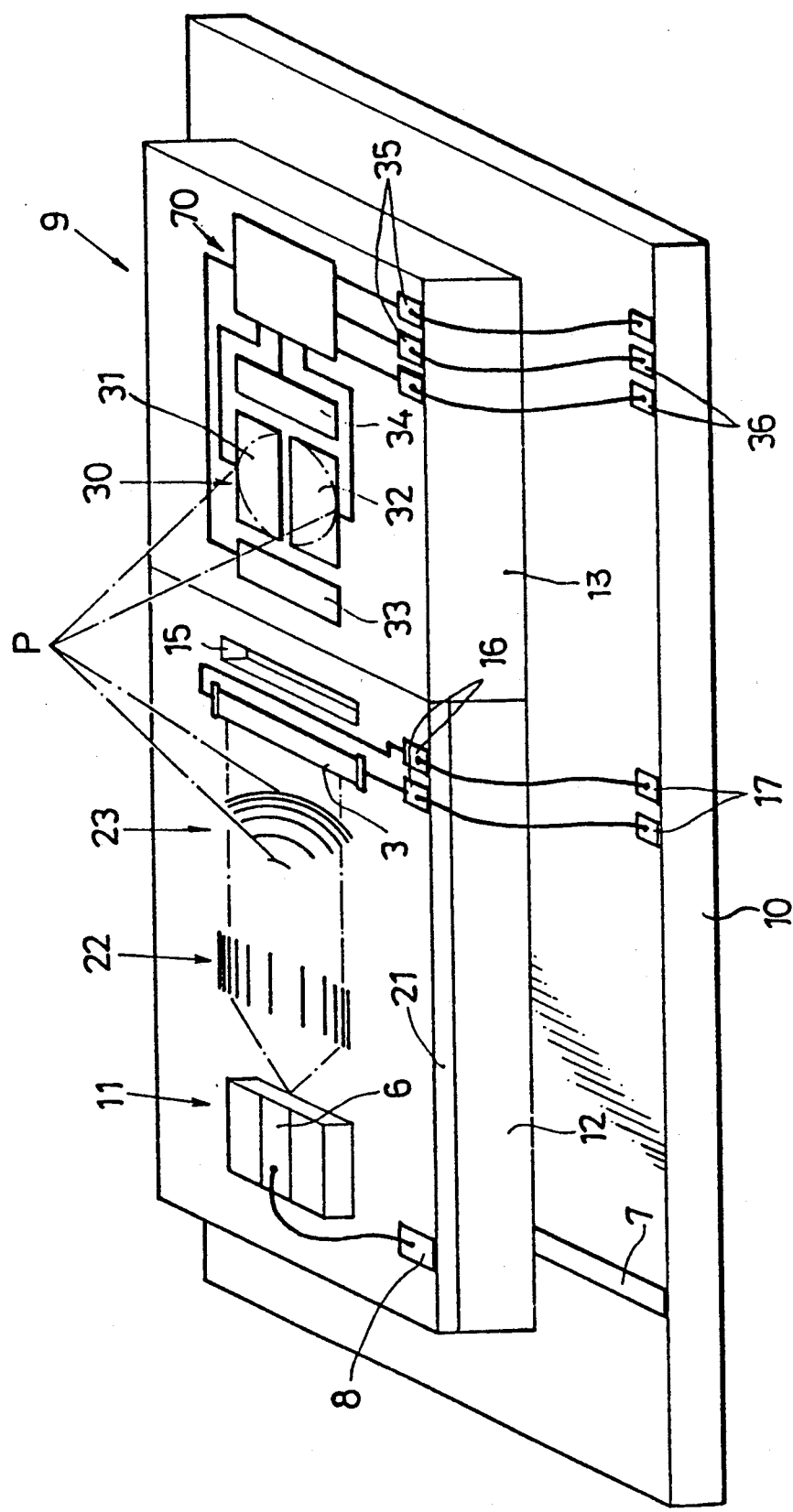

FIG. 24 shows another pick-up head 9, wherein the light receiving unit 30 and the amplifier circuit 70 are formed on a substrate 13 which is separate from the substrate 12 formed with the waveguide layer 21. The substrate 13 is made of Si.

For example, nGaAs crystal is used for the substrate 12, over which the waveguide layer 21, which is made of pGaAs, is formed with an AlGaAs layer provided therebetween as will be stated in detail. The semiconductor laser 11 is integral with the substrate 12 and is driven by a drive current given to electrodes 7 and 8. The laser beam emerging from the laser 11 is incident on, and propagates through, the layer 21.

When the substrate 12 and the substrate 13 are made separate, the substrate 12 to be formed with the waveguide layer 21 can be prepared from a material other than Si, the laser 11 can be prepared integrally with the substrate 12. Further when the substrate 12 is made of a material, such as $LiNbO_3$ or GaAs, which has an electrooptical effect, focusing and tracking control can be effected electrically as already described.

Figure 26:
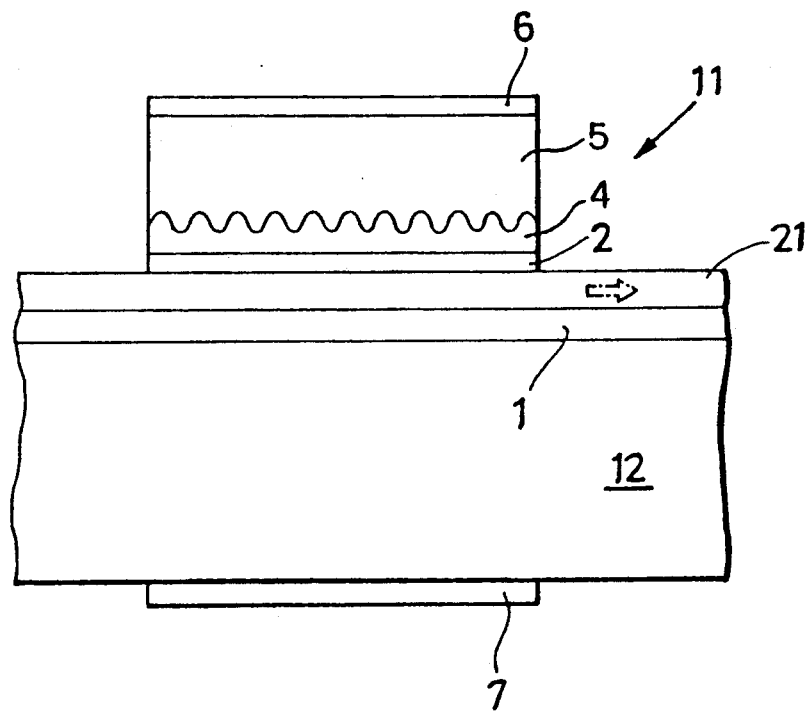
FIG. 26 is a sectional view showing another example of semiconductor laser.

FIG. 26 shows an example of semiconductor laser in section which is made integral with the substrate 12 as shown in FIG. 24. The laser 11 comprises a substrate 12 of nGaAs, a layer 1 of nAlGaAs (e.g. $nAl_{0.3}Ga_{0.7}As$) formed over the substrate 12, and a layer of pGaAs serving as a waveguide layer and formed over the layer 1. The pGaAs layer 21 serves also as the active region of the laser 11. Over the active layer 21 is formed a layer 2, for example, of $pAl_{0.17}Ga_{0.83}As$, which is covered with a grating layer 4 of $pAl_{0.07}Ga_{0.83}As$. Over the layer 4 is a layer 5 of $pAl_{0.3}Ga_{0.7}As$. An electrode 6 is formed over the layer 5, with an $SiO_2$ interposed therebetween when so required.

When the substrate having the waveguide layer is separate from the semiconductor laser, the laser beam from the laser must be coupled to the waveguide layer in one mode or another. One method of optical coupling is the butt edge method already mentioned, by which the active layer of the laser is opposed to the waveguide layer in direct end-to-end contact therewith. However, the end face of the substrate formed with the waveguide layer must then be polished with high precision, while it is technically difficult to assure optical alignment with respect to the upward-downward direction and lateral direction. Integral formation of the laser and the substrate has the advantage of eliminating the need for the optical alignment and end face polishing.

Figure 27:
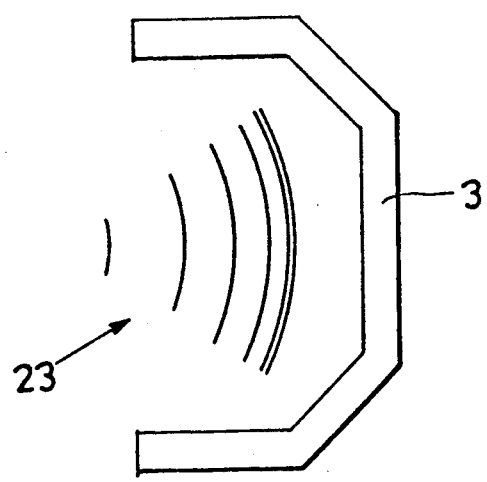
FIG. 27 is a plan view showing another example of leak light sensor.

The leak light sensor 3 is provided across the path of propagation of leak light and has a length larger than the width of the path. The sensor 3 may have a still larger length so as to receive a larger amount of light. FIG. 27 shows another example of leak light sensor 3, which is so shaped as to surround the coupling lens 23 when seen from above. Scattering light at the coupling lens 23 is also detectable by the sensor thus shaped.

FIG. 28 shows other examples of leak light sensors.

Figure 28A:
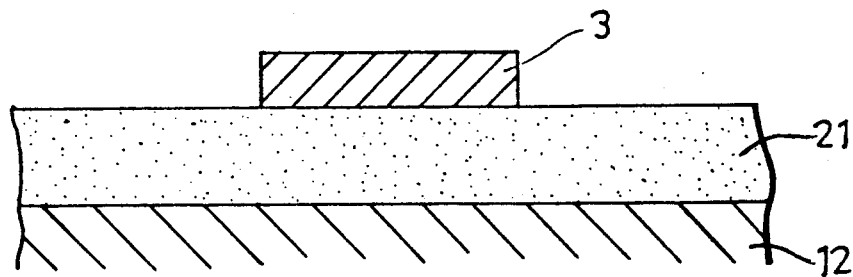
FIGS. 28(A) to (I) are sectional views showing various examples of leak light sensors.

FIG. 28(A) shows a sensor 3 which is merely formed on the waveguide layer 21. Since the field distribution of light through the layer 21 is present also in the sensor 3, a light intensity detection signal is obtained from the sensor 3.

Figure 28B:
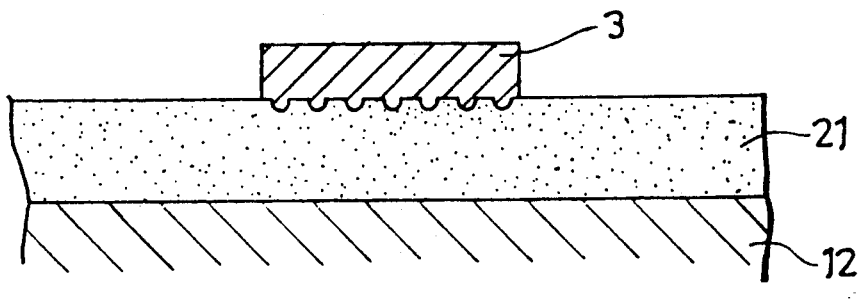

With the arrangement of FIG. 28(B), the surface of the waveguide layer 21 is partly formed with a grating extending at right angles with the direction of propagation of light. A sensor 3 is formed over the grating, for example, by vacuum evaporation. By virtue of presence of the grating, leak light propagating through the layer 21 is emitted and made incident on the sensor, with the result that a considerable amount of light energy can be utilized by the sensor 3.

Figure 28C:
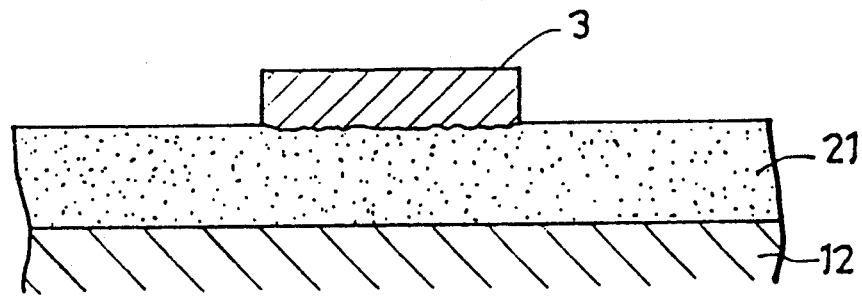

The waveguide layer 21 shown in FIG. 28(C)) has a rough upper surface, on which a sensor 3 is formed.

Figure 28D:
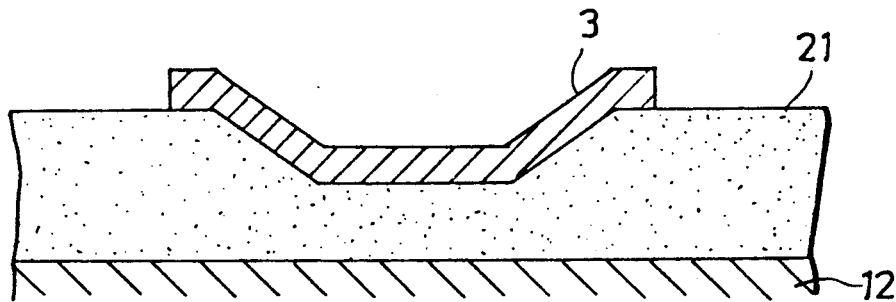

The waveguide layer 21 shown in FIG. 28(D) has a recess formed, for example, by etching and provided with a sensor 3 formed therein.

Figure 28E:
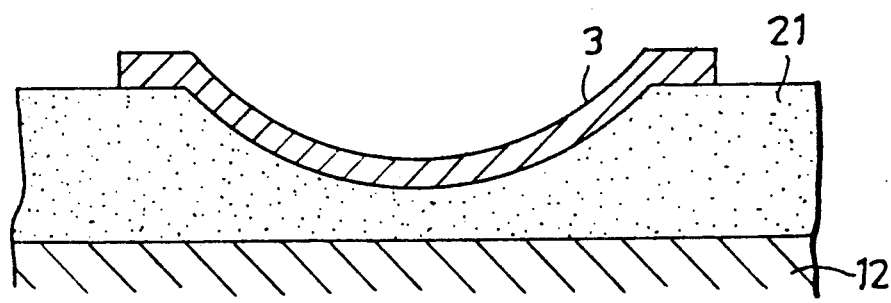

The layer 21 of FIG. 28(E) has a concavity which is formed, for example, by polishing.

Figure 28F:
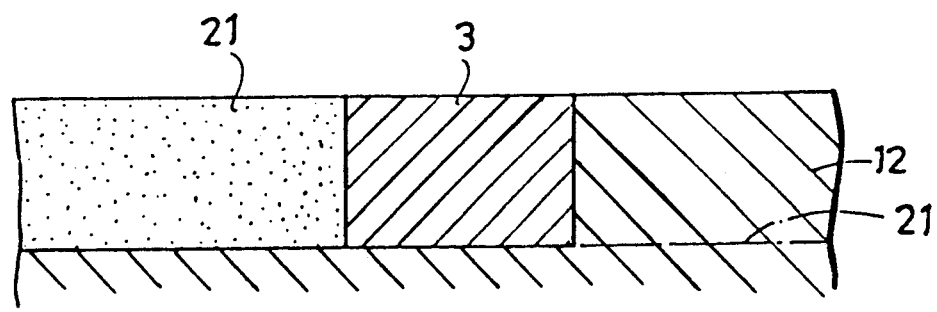

With the arrangement of FIG. 28(F), a sensor 3 is embedded in the substrate 12, in contact the end face of the waveguide layer 21 (indicated in solid line), or at an intermediate portion of the layer 21 (indicated in broken line). for example, a cavity is formed in the substrate 12, and the sensor 3 is provided therein by vacuum evaporation. The groove 15 may be serve as the cavity.

Figure 28G:
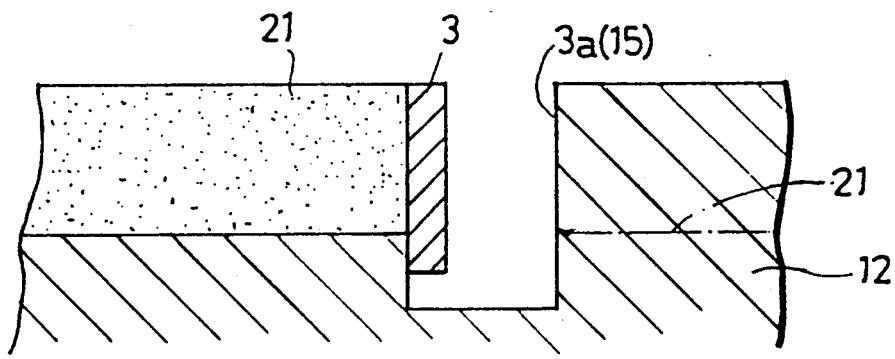

With the arrangement shown in FIG. 28(G), a sensor 3 is formed at the end of the layer 21, or in a cavity 3a (or the groove 15) formed at an intermediate portion of the layer 21, on an end face of the layer 21.

Figure 28H:
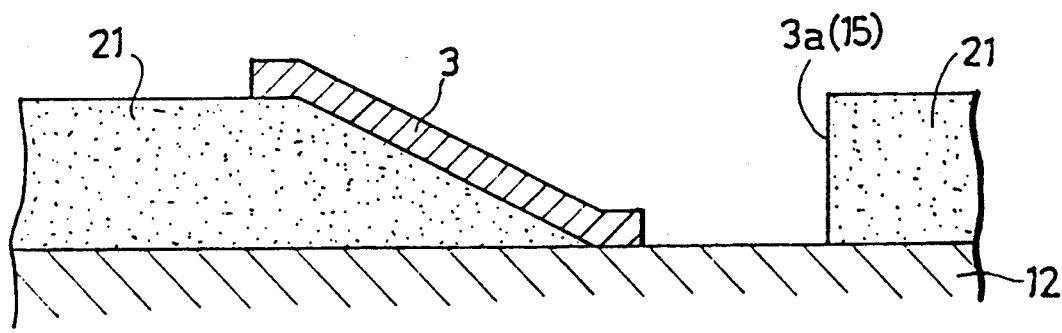

The waveguide layer 21 shown in FIG. 28(H) has a recess 3a or groove 15 having a depth equal to the thickness of the layer 21. The recess or groove 15 is defined at one side by a slanting surface extending over the entire depth. A sensor 3 is formed on the slanting surface.

Figure 28I:
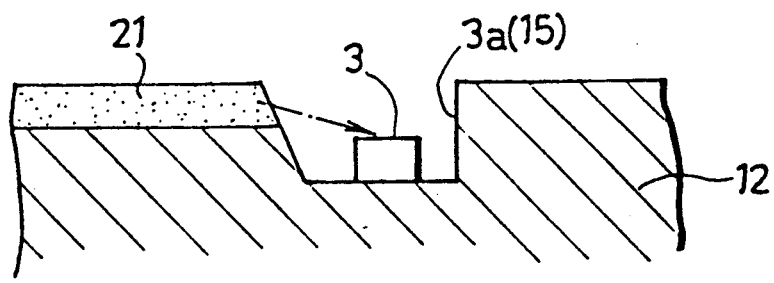

FIG. 28(I) shows another example. A cavity 3a or a leak light blocking groove 15 having a depth larger than the waveguide layer 21 is formed, and a chip 3 of photodiode serving as a sensor is provided within the cavity 3a or groove 15. The light emerging from the layer 21 impinges on the photodiode 3.

The laser 11 is controlled in response to the output signal from the sensor 3 in the known manner of feedback control. The detection signal of the sensor 3 is compared with the preceding value or a reference value at a given time interval (digital control) or continuously (analog control). If the signal value is maintained at a constant level, the current drive current value for the laser 11 is maintained. When the intensity of light received decreases, the drive current is increased to eliminate the difference. If the intensity of light increases, the drive current is reduced.

The leak light blocking groove 15 is formed straight substantially perpendicular to the direction of propagation of light. The groove 15 has the feature of being simple in structure and easy to make.

Figure 29A:
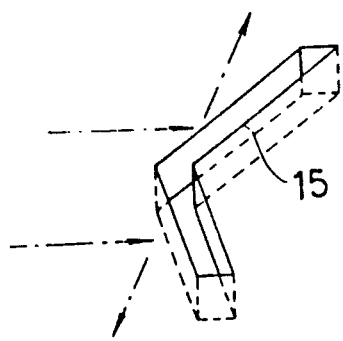
FIGS. 29(A) and (B) are perspective view showing other examples of leak light blocking groove.

FIG. 29 shows other examples of leak light blocking grooves 15. The groove 15 shown in FIG. 29(A) is inclined from a direction perpendicular to the direction of propagation of light so that the propagating light will be reflected in directions different from the propagation direction (e.g. approximately perpendicular thereto). Although the groove is in a flexed form and has a top point on the optical axis, the groove 15 may extend across the path of propagation of light obliquely. Use of this type of groove prevent the back talk noise that would occur when reflected light impinges on the laser 11 upon returning.

Figure 29B:
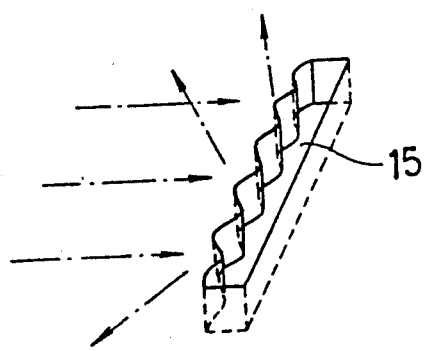

FIG. 29(B) shows a groove 15 defined by a corrugated wall surface at one side thereof toward the coupling lens. Leak light is scattered by the wall surface. The wall surface may be otherwise shaped to have projections or indentations.

The developed or improved embodiments can of course be used for the pick-up head of the three-beam type shown in FIG. 14 or 18.

What is claimed is:

1. An optical head device comprising:
   a base,
   a substrate supported by said base,
   an optical waveguide formed on said substrate,
   a laser light source supported by said base adjacent said waveguide, for propagating a laser beam into the waveguide,
   lens means disposed on the waveguide to emerge obliquely upwardly and for focusing the beam two-dimensionally at a focal position,
   light receiving means, supported on a surface of one of said base and said substrate which faces said focal position, for receiving the beam after it has been reflected toward said light receiving means by an optical record means from said focal position,
   a focusing drive mechanism for adjusting a position of the base and said substrate, said optical waveguide, said laser light source, said lens means and said light receiving means supported on said base upward or downward, and
   a tracking drive mechanism for adjusting a position of the base and said substrate, said optical waveguide, said laser light source, said lens means and said light receiving means supported on said base laterally.

2. A device as defined in claim 1 wherein said substrate has the waveguide, the lens means and the light receiving means positioned thereon.

3. A device as defined in claim 1, wherein said light receiving means generates a light receiving signal representing information relating to said beam and said device further comprises circuits for respectively producing a reading signal, a focusing error detection signal and a tracking error detection signal from the light receiving signal from the light receiving means, the focusing drive mechanism being controllable by the focusing error detection signal, and the tracking drive mechanism being controllable by the tracking error detection signal.

4. A device as defined in claim 1 wherein a leak light blocking groove is formed on the substrate between the lens means and the light receiving means.

5. A device as defined in claim 1 wherein means is provided for detecting the intensity of the beam propagating through the waveguide.

6. A device as defined in claim 5 wherein the beam intensity detecting means is formed on the substrate for detecting leak light from the waveguide.

7. A device as defined in claim 1 wherein the laser light source is a semiconductor laser formed integrally with the substrate.

8. A device as defined in claim 1 wherein the substrate formed with the light receiving means has an integrated circuit means for amplifying the output signal from the light receiving means.

9. A device for processing optical data comprising:
   a base;
   a substrate supported by said base and including a portion exhibiting electrooptical properties,
   an optical waveguide formed on said substrate,
   a laser light source for propagating a laser beam into the waveguide,
   lens means disposed on the waveguide and comprising a plurality of electrodes arranged perpendicular to a direction of propagation of said beam and in a path of said beam for causing the beam propagating through the waveguide to emerge obliquely upwardly and for focusing the beam two-dimensionally at a focal position, and
   light receiving means, supported on a surface of one of said base and said substrate which faces said focal position, for receiving the beam after it has been reflected toward said light receiving means by an optical record means from said focal position, said light receiving means generating a light receiving signal representing information relating to said beam, the lens means being formed on said portion of the substrate exhibiting said electrooptical properties and including a plurality of electrodes for controlling at least tracking of said focal position, said electrodes being controllable by the light receiving signal from the light receiving means.

10. A device as defined in claim 9 wherein said substrate commonly supports the waveguide, the lens means and the light receiving means.

11. A device as defined in claim 9 wherein the light receiving signal for controlling the voltage to be applied to the electrodes of the lens means includes a tracking error detection signal and a focusing error detection signal.

12. A device for processing optical data comprising:

a substrate including a portion exhibiting electrooptical properties, an optical waveguide formed on said substrate, a laser light source for propagating a laser beam into the waveguide, lens means disposed on the waveguide and comprising a plurality of electrodes arranged perpendicular to a direction of propagation of said beam and in a path of said beam for causing the beam propagating through the waveguide to emerge obliquely upwardly and for focusing the beam two-dimensionally at a focal position, and light receiving means for receiving the beam after it has been reflected toward said light receiving means by an optical record means from said focal position, said light receiving means generating a light receiving signal representing information relating to said beam, the lens means being formed on said portion of the substrate exhibiting said electrooptical properties and including a plurality of electrodes for controlling at least tracking of said focal position, said electrodes being controllable by the light receiving signal from the light receiving means, wherein the lens means comprises means for causing the beam propagating through the waveguide to emerge from the waveguide separated into three beams and for focusing the three beams two-dimensionally at three different positions.

* * * * *